(12) United States Patent
Obonai et al.

(10) Patent No.: US 6,286,254 B1
(45) Date of Patent: Sep. 11, 2001

(54) WATER-HOLDING CARRIER FOR PLANTS

(75) Inventors: Yasuhiro Obonai, Yamanashi-ken; Hiroshi Yoshioka; Yuichi Mori, both of Kanagawa, all of (JP)

(73) Assignee: Mebiol Inc., Tokyo (JP)

( * ) Notice: Subject to any disclaimer, the term of this patent is extended or adjusted under 35 U.S.C. 154(b) by 0 days.

(21) Appl. No.: 09/230,766

(22) PCT Filed: May 16, 1997

(86) PCT No.: PCT/JP97/01660

§ 371 Date: Feb. 1, 1999

§ 102(e) Date: Feb. 1, 1999

(87) PCT Pub. No.: WO98/05196

PCT Pub. Date: Feb. 12, 1998

(30) Foreign Application Priority Data

Aug. 1, 1996 (JP) .................................................. 8-203931
Feb. 7, 1997 (JP) .................................................. 9-025415

(51) Int. Cl.[7] .................................................. A01G 31/00
(52) U.S. Cl. .................................................. 47/63; 526/201
(58) Field of Search .................................. 47/63; 526/201

(56) References Cited

U.S. PATENT DOCUMENTS

| | | | |
|---|---|---|---|
| 4,367,323 | 1/1983 | Kitamura et al. | 526/201 |
| 5,827,743 | 10/1998 | Tanzawa | 435/430 |

FOREIGN PATENT DOCUMENTS

| | | |
|---|---|---|
| 1 591 415 | 6/1981 | (GB) . |
| 57-44627 | 3/1982 | (JP) . |
| 58-819 | 1/1983 | (JP) . |
| 58-180233 | 10/1983 | (JP) . |
| 59-62665 | 4/1984 | (JP) . |
| 59-189103 | 10/1984 | (JP) . |
| 60-147475 | 8/1985 | (JP) . |
| 60-163956 | 8/1985 | (JP) . |
| 63-55217 | 3/1988 | (JP) . |
| 63-195205 | 8/1988 | (JP) . |
| 2-79911 | 3/1990 | (JP) . |
| 2-248404 | 10/1990 | (JP) . |
| 3-86803 | 4/1991 | (JP) . |
| 3-49525 | 7/1991 | (JP) . |
| 4-74981 | 11/1992 | (JP) . |
| 5-35643 | 5/1993 | (JP) . |
| 5-60250 | 8/1993 | (JP) . |
| 6-276873 | 4/1994 | (JP) . |
| 6-287220 | 10/1994 | (JP) . |
| 6-322275 | 11/1994 | (JP) . |
| 7-33818 | 2/1995 | (JP) . |
| 8-266147 | 10/1996 | (JP) . |
| 9-78050 | 3/1997 | (JP) . |
| WO97/08938 | 3/1997 | (WO) . |

OTHER PUBLICATIONS

Kawashima, et al., "Influences on the Early Growth of Vegetables by a Super Absorbent with Cross–Linked Forms of Polyacrylate", 1984, pp. 1–8.

Sugimura, et al., "Utilization of High Water Absorptive Polymers as Greening Engineering Material", 1983, pp. 11–15.

"Bioscience and Industry", vol. 52, No. 8, 1994, pp. 623–624.

"An Outline of Plant Dietetics" 1974, pp. 118–120.

"Water Constant", 1977, pp. 88–89.

*Primary Examiner*—Charles T. Jordan
*Assistant Examiner*—Francis T. Palo
(74) *Attorney, Agent, or Firm*—Leydig, Voit & Mayer, Ltd.

(57) ABSTRACT

A water-retaining support for a plant exhibiting a water-retaining ability comparable to that of a polyacrylic acid-type hydrogel without inhibition of root origination or root elongation. The water-retaining support for a plant includes a hydrogel-forming polymer having a calcium ion absorption of less than 50 mg per 1 g of its dry weight and having a water absorption magnification in ion-exchange water (at 25° C.) of 100 or more. When the water-retaining support is used, a plant may be supplied with sufficient water without suffering from a deficiency of calcium ions.

25 Claims, 11 Drawing Sheets

SINGLE-CELL PARTITION
(WITH EXTENSION)

4-CELL PARTITION

<CHECKERED PATTERN-TYPE>

<SPOT-TYPE>

WATER-HOLDING CARRIER FOR PLANTS

TECHNICAL FIELD

The present invention relates to a water-retaining support (or carrier) for plant which can support or hold a plant at the time of the growth of the plant and can also function as a source for supplying water to the plant. More specifically, the present invention relates to a water-retaining support for plant which can supply water to a plant without inhibiting the growth of the plant, when the support is used as a water-retaining support for fluid seeding (or seeding using a fluid), farm cultivation, field (or bare ground) cultivation, virescence (or greening) engineering, etc.

The water-retaining support for plant according to the present invention is also usable in combination with another plant support such as soil so as to enhance the water-retaining ability of the other plant support (i.e., usable as a water-retaining agent) at the time the growth of a plant.

BACKGROUND ART

Polycarboxylic acid-type highly water-absorbing resins, especially polyacrylic acid-type polymers, which have been used in a large quantity for diapers, menstrual goods, etc., are also brought into use in the field of agriculture due to their inexpensiveness and excellent water-retaining ability.

For example, hydrogels of the polyacrylic acid-type polymers have been used as a support for fluid seeding; or a water-retaining support for virescence engineering, water-saving cultivation, or cultivation on sandy soil, by utilizing their water-retaining ability.

However, it has been recognized that the conventional polyacrylic acid-type hydrogels affect the growth of a plant, and particularly, they cause a marked inhibition of the root origination and root elongation when the hydrogels are used in an amount exceeding their appropriate amount (Kazuo Kawashima, et al., "Influences of Highly Water-Absorbing Polymer Materials on Initial Growth of Crops," Sand Dune Research, 31(1), 1–8, 1984).

Particularly, when the conventional polyacrylic acid-type hydrogel is used as a support for tissue culture, a support for fluid seeding, and a support for virescence engineering, a plantlet, seed, etc., of a plant are caused to directly contact the high-concentration polyacrylic acid-type hydrogel, and therefore its root origination and root elongation are markedly inhibited, whereby the use of the polyacrylic acid-type hydrogel is severely restricted. It has also been recognized that, in a case where the conventional polyacrylic acid-type hydrogel is used as a water-retaining support for farm or field cultivation, the elongation of the root is inhibited when the concentration of the polymer in the vicinity of the root is increased so as to enhance the effect of the water-retaining support.

As an example of the phenomenon such that the above-mentioned hydrogel comprising a polyacrylic acid-type resin markedly inhibits the growth of a plant, there has been reported an experiment wherein distilled water was absorbed into a crosslinked sodium polyacrylate so as to form a hydrogel, and the thus obtained hydrogel was caused to contact seeds of cucumbers and kidney beans for respective periods of time (3, 6, 9, 12, 24 and 48 hours), and then the states of the germination and root origination of the seeds were observed (Kazuo Kawashima, et al., "Influences of Highly Water-Absorbing Polymer Materials on Initial Growth of Crops," Sand Dune Research, 31(1), 1–8, 1984).

As a result of such experiments, it has been reported that the growth of roots was markedly suppressed in the case of cucumber seeds, when they are caused to contact the hydrogel for 36 to 48 hours, and that the inhibition of root growth was also observed similarly in the case of kidney beans. Further, it has been reported that the $\alpha$-naphtylamine-oxidizing ability of the root was markedly reduced when the root is caused to contact the hydrogel for 5 hours or more. In this report, such growth inhibition and functional hindrance are presumably attributable to a fact that the plant cannot effectively use the water contained in the hydrogel.

On the other hand, it has been reported that, when rice seeds were sown on a hydrogel which had been prepared by causing crosslinked sodium polyacrylate to absorb water, and then the process of the root origination was observed, serious hindrance in the root origination was recognized (Yorio Sugimura, et al., "Utilization of Highly Water-Absorbing Polymer as Virescence Engineering Material," Techniques of Virescence Engineering, 9(2), 11–15, 1983). In this report, no hindrance in the root origination was observed when the hydrogel was dialyzed with tap water, but the recovery of the root growth was not observed even when the hydrogel was dialyzed with distilled water. In this report, it is presumed that, when the hydrogel is washed or dialyzed with a weak electrolytic solution such as tap water, the water-absorption amount force toward the hydrogel was weakened, and the migration of water from the gel to the root hair is facilitated, thereby to solve the hindrance in the root origination.

It has also been reported an example wherein the elongation of soybean root was markedly inhibited in a soil which had been mixed with a crosslinked sodium polyacrylate hydrogel, as compared with that in the case of a polyvinyl alcohol-type hydrogel (Tomoko Nakanishi, Bioscience & Industry, 52(8), 623–624, 1994). In this reference, this phenomenon is presumably attributable to a fact that the water in the sodium polyacrylate hydrogel is less liable to be utilized for a plant.

As described above, it has heretofore been considered that the inhibition of the growth of a plant in a hydrogel comprising an alkali metal salt of crosslinked polyacrylic acid is attributable to a fact that the water in the hydrogel is not effectively utilized for the plant.

An object of the present invention is to provide a water-retaining support for plant which has solved the above-mentioned problems of the hydrogel water-retaining support encountered in the prior art.

Another object of the present invention is to provide a water-retaining support for plant which has a water-retaining ability comparable to that of the conventional polyacrylic acid-type hydrogel, and does not substantially cause an inhibition in root origination or in root elongation.

Disclosure of Invention

As a result of earnest study, the present inventors have found that the effect of a hydrogel is too strong to recognize that the inhibition of the root elongation is simply attributable to the effectiveness in the utilization of water in the hydrogel.

As a result of further study based on the above discovery, the present inventors have also found that the calcium ion-adsorbing ability in the hydrogel has an important effect on the inhibition of root origination or the inhibition of root elongation of a plant which is in contact with the hydrogel.

The water-retaining support for plant according to the present invention is based on the above discoveries and comprises a hydrogel-forming polymer having a calcium ion absorption of less than 50 mg per 1 g of the dry weight thereof and having a water absorption magnification in ion-exchange water (at room temperature; 25° C.) of 100 or more.

Herein, the "water-retaining support" refers to one in a "dry state" unless otherwise noted specifically. As a matter of course, when such a support is distributed or circulated in an actual market, etc., the support may also be in a "hydrogel" state wherein a part or the entirety of the support retains water therein (the same as in the description appearing hereinafter).

As a result of further study based on the above discovery, the present inventors have found that there is a case wherein the above-mentioned "calcium ion absorption (amount)" may greatly be affected by the content of carboxyl groups bonded to the polymer chain of the hydrogel-forming polymer.

The water-retaining support for plant according to the present invention is based on the above discovery and is one comprising a hydrogel-forming polymer having a carboxyl group bonded to the polymer chain thereof, and having a content of alkali metal salt or ammonium salt of the carboxyl group of 0.3 to 2.5 mmol per 1 g of the dry weight of the resin.

According to the present inventors experiments, it has been found that a preferred embodiment of such a hydrogel-forming polymer is one further containing a calcium salt of the carboxyl group.

As a result of experiments as described hereinafter, the present inventors have found a fact that the conventional hydrogel comprising an "alkali metal salt of crosslinked polyacrylic acid" selectively adsorbs a heavy metal ion, mainly calcium ion. In other words, according to the present inventors' experiments, it is presumed that the conventional crosslinked polyacrylic acid-type hydrogel adsorbs ions (mainly comprising calcium ion) in agricultural water (such as well water, tap water, river water, and lake water) and the plant suffers from deficiency of calcium ion; or the hydrogel directly adsorbs ions (mainly comprising calcium ion) in the plant body from its roots, whereby the plant suffers from deficiency of calcium ion.

The calcium ion is absorbed by a plant in a physicochemical manner. When the liquid surrounding the plant contains calcium ion in a low concentration, the calcium ion is not absorbed by the plant but the calcium ion is often eluted out of the plant. It is considered that, in the thus caused calcium ion deficiency, the structure of cell membrane is damaged or broken, so that many important functions dependent on the membrane structure, such as cell division, are stopped or retarded, whereby the elongation of root is markedly inhibited in appearance (with respect to the details of such deficiency of calcium ion, e.g., "Outline of Plant Nutritional Science," edited by Kikuo Kumazawa, p. 118, Yokendo K. K., 1974, may be referred to).

As shown in Table 1 in "Examples" appearing hereinafter, when the present inventors prepared various hydrogels respectively having different calcium-absorbing abilities and subjected the resultant hydrogels to root origination tests for seeds, marked growth inhibitions were observed with respect to the roots and stems thereof, when the calcium ion absorption became 50 mg or more per 1 g of the dry weight of the water-retaining support. Thus, according to the present inventors' knowledge, it is presumed that the marked growth inhibition caused by the conventional hydrogel comprising the metal salt of crosslinked polyacrylic acid is not attributable to the property of water in the hydrogel but is attributable to the calcium ion deficiency in the plant caused by the absorption of calcium ion from the plant by the hydrogel.

BEST MODE FOR CARRYING OUT THE INVENTION

Figure 1:
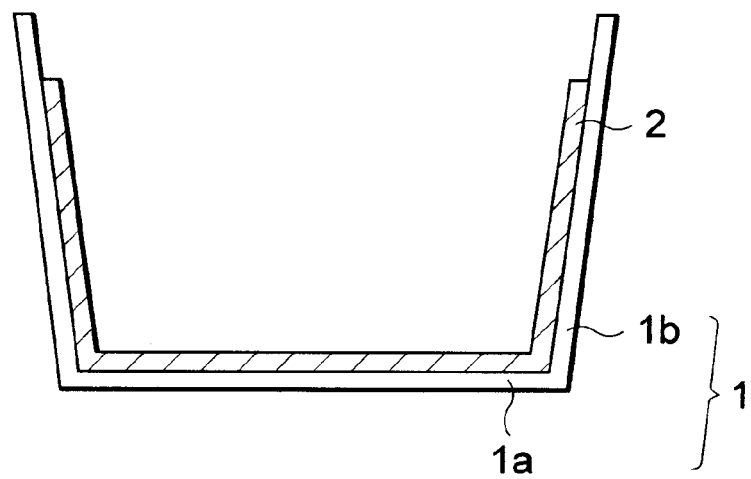
FIG. 1 is a schematic sectional view showing an embodiment of the plant-growing vessel according to the present invention.

Hereinbelow, the present invention will be described in detail with reference to the accompanying drawings as desired.

In the following description, "%" and "part(s)" representing a quantitative proportion or ratio are those based on weight, unless otherwise noted specifically.

Water-Retaining Support

The water-retaining support according to the present invention comprises a hydrogel-forming polymer having a calcium ion absorption (amount) of less than 50 mg per 1 g of the dry weight thereof, and having a water absorption magnification in ion-exchange water of 100 (times) or more. In the present invention, the above-mentioned "calcium ion absorption" and "water absorption magnification" in ion-exchange water may suitably be measured, e.g., by the following method.

Measurement of Calcium Ion Absorbing Amount 1 g of a dried water-retaining support is added to 1 L (liter) of aqueous calcium chloride solution having a calcium ion concentration of 200 mg/L. Then, the resultant mixture is left standing for 2 days (48 hours) in a constant-temperature bath (or thermostatic chamber) at room temperature (25° C.)

while the mixture is stirred occasionally, thereby to cause the water-retaining support to absorb calcium ion while being swollen. The thus swollen water-retaining support is separated from the supernatant, and the calcium ion concentration in the remaining supernatant (excess amount thereof in the above-mentioned aqueous calcium chloride solution) is quantitatively determined by atomic absorption spectrometry (A mg/L). On the basis of the thus determined value (A) of the calcium ion concentration, the calcium ion absorption amount per 1 g of the water-retaining support is obtained by the following formula. At the time of the separation of the supernatant from the water-retaining support, there is a possibility that the non-crosslinked water-soluble polymer is dissolved in the supernatant, and therefore it is preferred to effect separation by ultrafiltration using an ultrafilter membrane which can fractionate the molecular weight of about 1,000 to 3,000.

Calcium ion absorption amount per 1 g of water-retaining support (mg/g)=200−A

When the calcium ion absorption amount measured by the above-mentioned method is 50 mg or more per 1 g of the dry weight of the water-retaining support, calcium ion deficiency is liable to occur in a plant which is in contact with the water-retaining support as shown in Example appearing hereinafter. The calcium ion absorption amount may preferably be 45 mg or less, more preferably 40 mg or less. (Measurement of Water Absorption Magnification in Ion-exchange Water)

A predetermined amount ($W_1$ g) of a dried water-retaining support is weighed, then is immersed in an excess amount (e.g., a weight which is at least 1.5 times the expected water-absorption amount of the above-mentioned water-retaining support) of ion-exchange water (having an electric conductivity of 5 $\mu$S/cm or less), and is then left standing in a constant-temperature bath at room temperature (25° C.) for 2 days (48 hours) whereby the support is swollen. An excess amount of water is removed by filtration, and thereafter the weight ($W_2$ g) of the water-retaining support which has absorbed water to be swollen therewith is measured. Then, the water absorption magnification is determined by the following formula:

water absorption magnification=$(W_2-W_1)/W_1$

If the water absorption magnification measured by the above-mentioned method is less than 100, it becomes difficult to sufficiently supply water to a plant when a predetermined amount of the water-retaining support is used. The water absorption magnification may preferably be 140 or more, more preferably 160 or more.

When the salt concentration is relatively low as in the case of agricultural water, the means for most effectively improving the water absorption magnification of a hydrogel is to introduce a dissociative ion group into the gel so as to expand the molecular chains in the gel and to simultaneously enhance the internal osmotic pressure in the gel.

Hydrogel-forming Polymer

The hydrogel-forming polymer constituting the water-retaining support according to the present invention refers to a polymer having a crosslinked or network structure, and has a property such that it retains water in the inside thereof on the basis of such a structure so as to form a hydrogel. Further, the "hydrogel" refers to a gel which at least comprise a crosslinked or network structure comprising a polymer, and water (as a dispersion liquid) retained by such a structure.

The "dispersion liquid" retained in the crosslinked or network structure is not particularly limited, as long as it is a liquid comprising water as a main or major component. More specifically, the dispersion liquid may for example be either of water per se, an aqueous solution and/or water-containing liquid (e.g., a mixture liquid of water and a monohydric or polyhydric alcohol).

In the present invention, it is preferred to use a product obtained by crosslinking a water-soluble or hydrophilic polymer compound, as the above-mentioned hydrogel-forming polymer. Such a crosslinked polymer has a property such that it absorbs water in an aqueous solution to be swollen, but is not dissolved therein. The water absorption rate may be changed by changing the kind of the above-mentioned water-soluble or hydrophilic polymer and/or the density (or degree) of crosslinking thereof.

When the aqueous solution of the above-mentioned hydrophilic polymer compound has a cloud point of 70° C. or below, it is possible to obtain a hydrogel-forming polymer such that it shows a decrease in the water absorption magnification thereof along with an increase in a temperature range of not lower than 0° C. and not higher than 70 ° C., and the water absorption magnification of the polymer is reversibly changeable with respect to temperature.

Water-soluble or hydrophilic polymer compound

Specific examples of the water-soluble or hydrophilic polymer constituting the water-retaining support according to the present invention may include: methyl cellulose, dextran, polyethylene oxide, polypropylene oxide, polyvinyl alcohol, poly N-vinyl pyrrolidone, poly N-vinyl acetamide, polyvinyl pyridine, polyacrylamide, polymethacrylamide, poly-N-acryloyl piperidine, poly-N-n-propyl methacrylamide, poly-N-isopropyl acrylamide, poly-N,N-diethyl acrylamide, poly-N-isopropyl methacrylamide, poly-N-cyclopropyl acrylamide, poly-N-acryloyl pyrrolidine, poly-N,N-ethyl methyl acrylamide, poly-N-cyclopropyl methacrylamide, poly-N-ethyl acrylamide, poly-N-methyl acrylamide, polyhydroxymethyl acrylate, polyacrylic acid, polymethacrylic acid, polyvinylsulfonic acid, polystyrenesulfonic acid and their salts, poly-N,N-dimethylaminoethyl methacrylate, poly-N,N-diethylaminoethyl methacrylate, poly-N,N-dimethylaminopropyl acrylamide, and their salts, etc.

Crosslinking

As the method of imparting or introducing a crosslinked structure to a polymer, there are a method wherein a crosslinked structure is introduced into the polymer at the time of the polymerization of the monomer for providing the polymer; and a method wherein a crosslinked structure is introduced to a polymer after the completion of the polymerization of the monomer. Each of these methods may be used in the present invention.

The former method (i.e., introduction of crosslinking at the time of monomer polymerization) may generally be conducted by utilizing the copolymerization with a bifunctional monomer (or a monomer having three or more functional groups). For example, such a method may be conducted by using a bifunctional monomer such as N,N-methylene bis-acrylamide, hydroxyethyl dimethacrylate, and divinylbenzene.

The latter method (i.e., introduction of crosslinking after monomer polymerization) may generally be conducted by forming a crosslink between molecules by utilizing light, electron beam, γ-ray irradiation, etc.

Further, the latter method may also be conducted by crosslinking a polymer, e.g., by using, as a crosslinking agent, a multi-functional molecule having a plurality of functional groups (such as isocyanate group) which is capable of being bonded to a functional group (such as amino group) in the polymer.

In the present invention, the above-mentioned water absorption rate of the hydrogel-forming polymer is dependent on the above-mentioned crosslinked structure, particularly the density of crosslinking of the polymer. In general, as the crosslinking density becomes lower, the water absorption rate tends to be increased.

In the former method, the crosslinking density may arbitrarily be controlled, e.g., by changing the copolymerization ratio of the bifunctional monomer. In the latter method, the crosslinking density may arbitrarily be controlled, e.g., by changing the quantity of irradiation such as light, electron beam, and γ-ray.

In the present invention, the crosslinking density may preferably be in the range of about 0.02 mol % to 10 mol %, more preferably about 0.05 mol % to 4 mol %, in terms of the ratio of the moles of the branching point to the moles of all the monomer. Alternatively, when the crosslinked structure is introduced by the former method (introduction of crosslinking at the time of polymerization), the crosslinking density may preferably be in the range of about 0.03 wt.% to 3 wt.%, more preferably about 0.05 wt.% to 1.5 wt.%, in terms of the copolymerization weight ratio of the bifunctional monomer to all the monomers (inclusive of the bifunctional monomer per se).

When the crosslinking density exceeds about 10 mol %, the water absorption magnification of the hydrogel-forming polymer according to the present invention is decreased, whereby the effect of the hydrogel-forming polymer as the water-retaining support is decreased. On the other hand, when the crosslinking density is below about 0.02 mol %, the hydrogel-forming polymer becomes mechanically weak, and the handling thereof becomes difficult.

The crosslinking density (molar ratio of the branching points with respect to all the monomer) may be determined quantitatively, e.g., by $^{13}$C-NMR (nuclear magnetic resonance absorption) measurement, IR (infrared absorption spectrum) measurement, or elemental analysis.

Further, in the hydrogel-forming polymer constituting the water-retaining support according to the present invention, it is also possible to obtain a better balance between a high water absorption magnification and a high mechanical strength in the hydrogel-forming polymer by making the crosslinking density higher in the vicinity of the surface than that in the inside thereof (i.e., by introducing so-called "surface crosslinking"). In such an embodiment, the portion having a relatively high crosslinking density in the vicinity of the surface may mainly contribute to the high mechanical strength (and to an improvement in the non-stickiness between support particles), while the portion having a relatively low crosslinking density in the inside may mainly contribute to the high water absorption magnification. Thus, it becomes easy to realize a preferred mechanical strength and a preferred non-stickiness between the particles substantially without decreasing the water absorption magnification.

In view of the balance between the water absorption magnification and mechanical strength, the ratio (Ds/Di) of the highest crosslinking density Ds in the vicinity of the surface to the lowest crosslinking density Di in the inside of the particle in the above-mentioned embodiment may preferably be about 2 to 5, more preferably about 5 to 10 (particularly, about 10 to 100).

The crosslinking density in the vicinity of the surface and that in the inside of the particle may be measured by determining the ratio of the presence of the crosslinking agent in the vicinity of the surface and that in the inside of the particle, e.g., according to a local analysis technique such as electron spectroscopy for chemical analysis ESCA (XPS), electron probe microanalysis EPMA, attenuated total reflection (ATR), or secondary ion mass spectrometry SIMS (time-of-flight SIMS (TOF-SIMS), etc.).

In the water-retaining support for plant according to the present invention, when the hydrogel-forming polymer constituting the support has a high mechanical strength, it becomes easy to keep appropriate voids (or cavities) between the individual support particles, and the presence of the voids may further improve the capability of the support to supply oxygen to the root of a plant.

In the present invention, the method of introducing the surface crosslinking to the hydrogel-forming polymer is not particularly restricted, and it is possible to use, e.g., various kinds of known methods (or a combination of two or more of such methods).

Particularly, when the hydrogel-forming polymer in the present invention has a carboxyl group bonded to the polymer chain thereof, it is preferred to use a method wherein a crosslinking agent having at least two functional groups capable of reacting with the carboxyl group is used to crosslink a portion in the vicinity of the surfaces of fine polymer particles. Examples of such a crosslinking agent may include: epoxy compounds such as ethylene glycol diglycidyl ether (JP-A (Japanese Laid-Open Patent Application No.) Sho 57-44627); polyhydric alcohols such as glycerin (JP-A Sho 58-180223); poly-(or polyvalent) amine compounds, poly-aziridine compounds, or poly-isocyanate compounds (JP-A Sho. 59-189103); poly-epoxy compounds having an amino group (JP-A Sho. 63-195205); a reaction product of epihalohydrin and a low-molecular primary amine such as ammonia or ethylene diamine (JP-A Hei 2-248404); poly-azithidinium base compounds (JP-A Hei 6-287220), etc.

When the molecular weight of the above crosslinking agent is low, the crosslinking agent is liable to penetrate into the inside of the hydrogel-forming polymer, and there is a case wherein the crosslinking has a strong tendency to reach the inside thereof without stopping at the vicinity of the surface. From such a viewpoint, the molecular weight of the crosslinking agent may preferably be at least 1,000, more preferably within the range of 10,000 to 100,000, in terms of weight-average molecular weight,.

As the technique for crosslinking the surface of a hydrogel-forming polymer with the above crosslinking agent, it is possible to use a method wherein a hydrogel-forming polymer to be surface-crosslinked is dispersed in a large amount of a low-boiling point organic solvent such as alcohol, ketone and ether containing water, and then a crosslinking agent is added to the resultant mixture, thereby to effect crosslinking (JP-A Sho. 57-44627); a method wherein a crosslinking agent is added to a hydrogel-forming polymer containing water wherein the water content is adjusted to 10 to 40 wt.% thereby to effect crosslinking (JP-A Sho. 59-62665); a method wherein a crosslinking agent and water are absorbed into a hydrogel-forming polymer in the presence of inorganic powder, and the resultant mixture is heated under stirring, so as to simultaneously effect crosslinking and removal of water (JP-A Sho. 60-163956); a method wherein 1 wt. part of a hydrogel-forming polymer is dispersed into a large amount of a hydrophilic inactive solvent having a boiling point of 100° C. or higher, in the presence of inactive inorganic powder and 1.5 to 5.0 wt. parts of water, thereby to effect crosslinking (JP-A Sho. 60-14745); a method wherein a hydrogel-forming polymer is treated with a crosslinking agent and an aqueous solution containing any of an alkylene oxide adduct of monohydric alcohol, a monovalent salt of organic acid, and a lactam, thereby to effect reaction (JP-A Hei 7-33818); etc.

Amount of Residual Organic Material in Polymer

In view of suppression of an adverse effect (such as growth inhibition, necrosis of root tip, and leaf withering) on a plant to be grown by using the water-retaining support according to the present invention, the amount of an organic material remaining in the above-mentioned hydrogel-forming polymer may preferably be as small as possible. More specifically, the total amount of organic materials (reductive materials) may preferably be 15 ppm or less, more preferably 10 ppm or less (particularly, 5 ppm or less), in terms of the value of chemical oxygen demand (COD) due to all the organic materials remaining in the liquid which has been obtained by subjecting the polymer to extraction with distilled water in an amount of 1,000 times that of the polymer. The COD value may preferably be measured, e.g., by the following "potassium permanganate method."

Amount of Residual Free Carboxylic Acid (or Carboxylate) in Polymer

The amount of free (volatile) carboxylic acid (or carboxylate), such as acetic acid (or acetate), remaining in 1 g of the dry weight of the dried hydrogel-forming polymer used in the present invention may preferably be 0.5 mmol or less, more preferably 0.3 mmol or less (particularly, 0.1 mmol or less). This "carboxylic acid" may preferably be measured, e.g., by the following "steam distillation method."

Potassium Permanganate Method 1 g of the dried water-retaining support is immersed in 1000 g of distilled water, and left standing in a constant-temperature bath under stirring for 2 days (48 hours) at room temperature (25° C.) so as to extract the organic material (reductive material) remaining in the above water-retaining support. 100 ml of the resultant supernatant is collected from this mixture, and 5 ml of 9N-sulfuric acid and 20 ml of an N/80 potassium permanganate solution are added thereto. After the resultant mixture is boiled for 5 minutes, 20 ml of N/80 oxalic acid solution is added thereto, and the excess of the oxalic acid is titrated by using an N/80 potassium permanganate solution (B ml). The chemical oxygen demand (COD) is calculated by the following formula:

COD (ppm)=B

Steam Distillation Method 1 g of the dried water-retaining support is immersed in 1000 g of distilled water, and is left standing in a constant-temperature bath under stirring for 2 days (48 hours) at room temperature (25° C.) so as to extract the free carboxylic acid (carboxylate) remaining in the above water-retaining support. 100 ml of the supernatant is collected from the resultant mixture, 10 ml of 85% phosphoric acid is added thereto, and the resultant mixture is subjected to steam distillation. The resultant distillate is titrated by using a 0.01N-aqueous sodium hydroxide solution (C ml) while using phenolphthalein as an indicator. The free (volatile) carboxylic acid (carboxylate) remaining in 1 g of the dried water-retaining support is determined as C/10 (mmol).

Polymer Having Carboxyl Group

Examples of an embodiment of the hydrogel-forming polymer having a calcium ion absorption suitable for retaining water for a plant and also having a preferred water absorption magnification in ion-exchange water may include, e.g., a hydrogel-forming polymer having a carboxyl group bonded to the polymer chain thereof wherein the polymer chain is crosslinked, and the content of an alkali metal salt or ammonium salt of the carboxyl group is 0.3 to 2.5 mmol per 1 g of the polymer. The content of the alkali metal salt or ammonium salt of carboxyl group may preferably be 0.5 to 2.0 mmol (particularly, 1.0 to 1.5 mmol). Such a polymer having a carboxyl group may also preferably have the above-mentioned amount of residual organic material and/or the amount of carboxylic acid. The content of the alkali metal salt of the carboxyl group may preferably be measured, e.g., by the following method.

Method of Measuring Content of Carboxyl Group Salt 0.2 g of the dried water-retaining support is weighed in a platinum crucible, is subjected to ashing in an electric furnace, and thereafter the support is dissolved in 5 ml of 1N-hydrochloric acid. Then, distilled water is added to the resultant mixture so as to provide a total volume of 50 ml, and the cation concentration (D mM) therein is determined according to atomic absorption spectrometry. The content of carboxyl group salt in 1 g of the dried water-retaining support is calculated as D/4 (mmol).

The conventional hydrogel comprising crosslinked product of an alkali metal salt of polyacrylic acid has a water absorption magnification which is markedly higher than that of a hydrogel comprising a crosslinked product of a nonionic hydrophilic polymer, and has been used as a water-retaining support in the agricultural field because of such a high water absorption magnification. However, according to the present inventor's experiments, in the hydrogel comprising the crosslinked product of the alkali metal salt of polyacrylic acid which has conventionally been developed as one to be used for agriculture, the content of the introduced dissociative ion groups is very high (e.g., the amount of the introduced alkali metal salt of acrylic acid is about 6 mmol or more per 1 g of the dried resin), whereby the hydrogel has a tendency such that it adsorbs heavy metal ions such as calcium ion which are essential for the growth of a plant, and it markedly inhibits the growth of the plant, as described above.

In contrast thereto, according to the present inventors' experiments, it has been found that when 0.3 to 2.5 mmol of a dissociative ion group (e.g., alkali metal salt or ammonium salt of carboxyl group) is introduced into a water-retaining support per 1 g of the dried support, the support shows a water-retaining effect (water absorption magnification in ion-exchange water of 100 or more) which is sufficient for growing a plant without causing deficiency of calcium ion in the plant.

Here, the alkali metal salt or ammonium salt is preferred as the dissociative ion group, and sodium salt or potassium salt is preferred as the alkali metal salt. In view of the effect on the plant, it is preferred to use a potassium salt or an ammonium salt which can be absorbed by the plant as an essential nutrient. When the content of the alkali metal salt of carboxyl group is less than 0.3 mmol per 1 g of the dried water-retaining support, it is difficult for the water-retaining support to have a water absorption magnification of 100 or more. On the other hand, when the content of alkali metal salt of carboxyl group exceeds 2.5 mmol, the calcium ion absorption is liable to become 50 mg or more per 1 g of the dried water-retaining support Monomer The hydrogel-forming polymer may be obtained, e.g., by the ternary polymerization of a monomer (I) having an alkali metal salt or ammonium salt of carboxyl group, a hydrophilic monomer (II), and a crosslinking monomer (III).

Specific examples of the monomer (I) may include alkali metal salts or ammonium salts of acrylic acid, methacrylic acid, maleic acid, itaconic acid, etc. These monomers may be either polymerized as a salt of monomer, or polymerized as a carboxylic acid monomer and then converted into a salt thereof by neutralization after the polymerization. However, the content thereof may preferably be set to 0.3 to 2.5 mmol per 1 g of the water-retaining support Specific examples of the hydrophilic monomer (II) may include acrylic acid, methacrylic acid, maleic acid, itaconic acid, acrylamide, methacrylamide, N-vinylacetamide, etc. When a monomer containing a carboxylic acid is used as the hydrophilic monomer (II), the resultant hydrogel has a tendency to have a low pH value. Accordingly, in this case, the alkali metal salt or ammonium salt content of the carboxyl group may preferably be set to 1.0 to 2.5 mmol per 1 g.

In such a case, it is also possible to convert a portion of the monomer containing the carboxylic acid into calcium salt so as to be copolymerized. According to the present inventors' investigation, it has been found that such a calcium salt-type monomer shows an effect of decreasing the calcium ion absorption of the water-retaining support, an effect of avoiding a decrease in pH, and further an effect of accelerating the polymerization.

Specific examples of the crosslinking monomer (III) may include N,N'-methylene bis(meth)acrylamide, N,N'-ethylene bis(meth)acrylamide, ethylene glycol di(meth)acrylate, and diethylene glycol di(meth)acrylate, etc. The amount of the crosslinking monomer (III) to be used may generally preferably in the range of 0.01 to 5 mol %, more preferably in the range of 0.1 to 1 mol % with respect to all the monomers (while somewhat depending on the concentration for the polymerization). When the amount of the monomer to be used is less than 0.01 mol %, the strength of the water-retaining support tends to become insufficient. On the other hand, when the amount of the monomer to be used exceeds 5 mol %, it becomes difficult for the water-retaining support to have a water absorption magnification of 100 or more.

It is also possible to obtain the hydrogel-forming polymer by the saponification of a copolymer comprising vinyl acetate and maleic anhydride, a copolymer comprising vinyl acetate and acrylic acid (acrylate), etc. The thus obtained polymer compound is a polyvinyl alcohol-type polymer. When such a polymer is prepared so as to provide a content of alkali metal salt or ammonium salt of the carboxyl group bonded to the polymer of 0.3 to 2.5 mmol per 1 g of the dry weight, it is possible to obtain a water-retaining support according to the present invention having a calcium ion absorption of less than 50 mg per 1 g of the water-retaining support and having a water absorption magnification in ion-exchange water of 100 or more.

Treatment With Calcium Ion

The hydrogel-forming polymer may also be obtained by treating a commercially available polyacrylate-type highly water-absorbing resin with a strong acid or calcium ion. In general, in the commercially available polyacrylate-type highly water-absorbing resin, at least a half of the carboxyl groups bonded to the polymer chain are in the state of alkali metal salts, and the content thereof is at least about 6 mmol per 1 g of the resin. Therefore, the calcium ion absorption per 1 g of the resin becomes 120 mg or more, and therefore is inappropriate as the water-retaining support for a plant.

In the present invention, when the hydrogel-forming polymer contains calcium salt of carboxyl group, the calcium salt content may preferably be at least 0.1 mmol (more preferably about 1.0 to 3.0 mmol) per 1 g of the dry weight of the hydrogel-forming polymer. Such a content of the calcium salt of carboxyl group may preferably be measured, e.g., by the following method.

Method of Measuring Content of Carboxyl Group Calcium Salt 0.2 g of the dried water-retaining support is weighed in a platinum crucible, is subjected to ashing in an electric furnace, and thereafter the support is dissolved in 5 ml of 1N-hydrochloric acid. Then, distilled water is added to the resultant mixture so as to provide a total volume of 50 ml, and the calcium concentration (E mM) therein is determined according to atomic absorption spectrometry. The content of carboxyl group calcium salt in 1 g of the dried water-retaining support is calculated as E/2 (mmol).

When a strong acid such as hydrochloric acid, nitric acid and sulfuric acid, or an aqueous calcium ion solution such as calcium chloride solution and calcium nitrate solution is added to such a commercially available polyacrylate-type highly water-absorbing resin, the alkali metal salt of carboxyl group in the highly water-absorbing resin is substituted by carboxylic acid or calcium salt of carboxyl group. Therefore, when the amount of the strong acid or calcium ion to be added is appropriately set, the content of alkali metal salt of the carboxyl group bonded to the polymer may be adjusted to 0.3 to 2.5 mmol per 1 g of the dried water-retaining support, thereby to provide a water-retaining support for plant according to the present invention having a calcium ion absorption of less than 50 mg per 1 g of the dry weight and having a water absorption magnification in ion-exchange water of 100 or more.

Here, when the carboxyl group is substituting by carboxylic acid, the resultant hydrogel has a strong tendency to become acidic. Accordingly, particularly in this case, the content of alkali metal salt of carboxyl group may preferably be adjusted to be 1.0 to 2.5 mmol per 1 g of the dried water-retaining support.

pH of Water-Retaining Support for Plant

The pH (hydrogen ion concentration) of conventional water-retaining supports for plant containing a hydrogel-forming polymer ranges from neutral to weakly alkaline. According to the present inventors' knowledge, it is presumed that such a phenomenon is attributable to the reaction condition etc., at the time of the synthesis of polymer.

In contrast, the present inventors have found that, even in a water-retaining support containing a hydrogel-forming polymer, in general, the pH thereof may preferably be weakly acidic so as to provide an environment suitable for the growth of a plant.

In general, in the case of a hydrogel comprising a polymer having a carboxyl group, it has a tendency such that the amount of the calcium absorption of the polymer is decreased as the hydrogen ion concentration in the polymer composition becomes higher (becomes more acidic). Consequently, also in view of the suppression of the adverse effect of the calcium ion absorption of the polymer on a plant, it is preferred that the pH of the water-retaining support for plant according to the present invention is in a weakly acidic range.

Further, the hydrogel comprising a polymer having a carboxyl group usually has a buffer effect as well, and therefore the hydrogel comprising a polymer having a carboxyl group is advantageous to the retention of a pH value suitable for plant growth, also in view of the buffer effect.

In general, the pH of the water-retaining support for plant may preferably be about pH 3 to 6.5 (more preferably about pH 4 to 6), though it may somewhat vary depending on the kind of a plant. Particularly, since the culture liquid for tissue culture is generally adjusted to pH 5.7 to 5.8, the pH of the hydrogel may preferably be 5.7 to 5.8.

In order to decrease the calcium-absorption, it is sufficient to make the portion of the carboxylic acid type in the carboxyl group larger than that of the alkali metal or ammonium salt-type thereof. However, when the portion of this acid type is too large, the pH of a water-retaining agent may tend to become too low or the swelling ratio of the water-retaining agent may tend to decrease. It is possible to obviate or diminish the demerit of a decrease in the pH or swelling ratio as described above by increasing the ratio of the calcium salt in the carboxyl group or decreasing the carboxyl group content (increasing the nonionic portion) in the polymer.

Method of Culturing Plant Using Hydrogel-Forming Polymer

Heretofore, an agar gel has generally been used as a support for tissue culture. However, in this case, a root is grown therein in a state where water is excessive and voids are little present, and therefore the root is elongated in a form which is different from that of the root grown in a farm cultivation step, whereby it is impossible to acclimate the root in the inside of the culture vessel. In addition, once an agar gel discharges the water content through the evaporation thereof or absorption thereof by a plant, the gel hardly absorbs water content again. Accordingly, the agar gel does not absorb the water constituting dew drops or the water once released from the gel in the vessel, whereby the acclamation of the root is adversely affected in some cases.

According to the present inventors' knowledge, it is presumed that such a problem of the agar gel is attributable to a fact that agar does not absorb further water after it is converted into a gel state, that agar does not absorb water again after it releases water and that it retains water only with a weak attracting force. In the present invention, such a water-retaining ability of the gel may be represented, e.g., by a pF value.

Here, the pF value (Potential of Free Energy: water absorption pressure) is a value representing the water-retaining ability of support. With respect to the details thereof, e.g., "Introduction to Soil" (Yasuo Takai and Hiroshi Miyoshi, Asakura Shoten, 1977, pp. 88–89) can be referred to.

In the present invention, the water which is absorbable by a plant may preferably be one having a pF value not higher than a capillary connection breaking point (pF value of about 2.8). Further, the pF value may preferably be not higher than 2.3 so that a plant is preferably grown in farm cultivation. The water having a pF value of 1.8 or less (gravitational water) can be absorbed by a plant, but it tends to flow out from a vessel having an open-type basement portion. In the case of a vessel having a closed-type or closed-like basement, the gravitational water may reside in the support at the basement of the vessel, thereby to cause root decay in some cases. In general tissue culture for a useful plant, the vessel is formed into a close system, and an agar gel is used as a support therefor, whereby the pF value during the culturing period of time becomes substantially almost zero.

On the other hand, when a hydrogel-forming polymer does not reach its equilibrium water absorption, the polymer tends to absorb water surrounding gel particles. In the present invention, when a hydrogel-forming polymer is used as a culturing support, the water contained in the gel is gradually decreased (pF value thereof is increased) due to the evaporation of water toward the outside of the vessel during the culturing process and the water absorption accompanying the growth of a plant, whereby the acclimation to water stress may be automatically effected during the culturing process. In addition, when the hydrogel-forming polymer is in form of a gel particle, the voids which are present outside of the gel particles are widened along with an increase in the pF value, whereby the amount of oxygen supply may be increased along with the growth of the plant.

Further, when the hydrogel-forming polymer is used in the present invention, the water in the form of dew drops in a vessel or the water separated from the polymer gel (which often adversely affects the acclimation of root) can also be absorbed by the hydrogel-forming polymer. Therefore, when the hydrogel-forming polymer is used as a support, the root may automatically be acclimated in a culturing step along with the growth of a plant, whereby the plant may favorably be grown even after the transferring thereof into a farm cultivation step.

Another advantage to be obtained in a case using a hydrogel-forming polymer as a support for tissue culture is that the space in the vessel may fully be utilized. The physical environment in a plant support can be divided or classified into three phases including a liquid phase, a gaseous phase, and a solid phase, and the hydrogel-forming polymer functions as both of the liquid and solid phases, thereby to secure a large amount of nutrient and water per unit volume.

Still another advantage to be obtained in a case using the hydrogel-forming polymer as a support for tissue culture is that additional culture liquid may easily be added to the support in the course of the culturing. In this case, the hydrogel-forming polymer may be caused to absorb the thus supplied culture liquid without sinking the plant in the culture liquid.

Voids in Support Comprising Hydrogel-Forming Polymer

When the strength of the hydrogel-forming polymer is low, the resultant gel tends to be deformed, thereby to reduce the voids among the gel particles. Therefore, it is possible to secure the voids by mixing a porous material such as pearlite with the gel. It is also possible to form voids among the gel particles, by increasing the strength of the hydrogel-forming polymer. For the purpose of enhancing the gel strength, it is possible to increase the crosslinking density or impart surface crosslinking to the gel.

In this case, known materials such as pearlite, bark, sponge, and sphagnum may be used without any particular restriction. In view of more effective exhibition of a bacteriostatic or fungistatic property (see Japanese Patent Application No. 6-139140; and PCT/JP95/01223) which is a characteristic of the hydrogel-forming polymer, it is preferred to use an inorganic porous material such as pearlite, as compared with the use of a natural organic matter which is decayable.

(Method of Utilizing Hydrogel-Forming Polymer in Suspension Culture

The hydrogel-forming polymer is also preferably usable in liquid culture (or suspension culture). In the conventional liquid culture, there have been posed problems such as the collision of cell agglomerates with the wall surface or collision between the cell agglomerates at the time when plantlets are being stirred during the liquid culture; and a decrease in the growth (or multiplication) rate of plant cells caused by a browning material produced by the cells due to the above physical damage.

In contrast, in the present invention, when hydrogel-forming polymer particles are mixed into a suspension culture system in an extent wherein a liquid state can be maintained, the gel particles may act as a cushion, thereby to suppress the production of the browning material, to enhance the growth rate, and to enlarge the cell agglomerate.

The ratio of the volume of the hydrogel to that of the liquid may preferably be 0.5 to 90%, more preferably 1 to 60%, and particularly preferably 5 to 40%.

Examples of the suspension culture may include the rotary shake culture with Erlenmeyer flasks, fermenter culture, large-size tank culture, etc.

Seed Germination and Germination Activity Test

In order to evaluate the effect of a water-retaining support upon a plant, it is preferred to conduct a germination and germination activity test for a seed by using, as a culture medium, the water-retaining support (hydrogel) which has absorbed agricultural water therein. For example, seeds of white radish sprouts (e.g., those sold by Takii Shubyo K. K.) which may easily be subjected to short-term germination and germination activity test may be used as a seed material, and synthetic water having a typical underground water composition (Table 2) may be used as the agricultural water in the above-mentioned test.

For example, the seed germination and germination activity test may be performed in the following manner.

16 ml of the above-mentioned synthetic water and 160 mg (1 wt. %) of each kind of water-retaining support are introduced into a test tube (having a diameter of 2.5 cm and a height of 15 cm), and the resultant mixture is fully stirred, and then the mixture is left standing for 30 minutes at 25° C., thereby to prepare a gel-like culture medium comprising the water-retaining support which has absorbed the agricultural water therein. 5 grains of the above-mentioned seed of white radish sprouts are uniformly put on the surface of the gel-like culture medium in each of test tubes, and the test tube is capped with a silicone plug having a 6-mm diameter hole filled with cotton. The thus capped test tube is cultured for 4 days in a culture room (25° C., illumination intensity of 2000 Lux, 16h-daytime), and the ratio of germination (number of germinated seeds/5 (grains)×100(%)) is investigated.

In the above-mentioned germination and germination activity test, the case wherein the seed coat is torn and the cotyledon unfolds is defined as the occurrence of germination, and the other cases are defined as no occurrence of germination. The length of the above-ground portion is measured as the average stem and leaf length from the base portion (branching point between the root and stem) of the germinated individual to its leaf tip, while the length of the underground portion is measured as the average root length from the base portion of the germinated individual to the tip of its main root. Further, the appearance of the root tip, etc., is observed.

Method of Using Water-Retaining Support

The water-retaining support according to the present invention may be used either singly or in combination with another plant-growing support as desired. The kind, ratio of amount to be used, etc., of the other plant-growing support are not particularly restricted. Preferred examples of the other plant-growing support may include: soil or gravel, sand, pumice, carbide, peat, vermiculite, bark, pearlite, zeolite, rock wool, sponge, sphagnum, crushed coconut shell, crypto-moss, etc. Each of these plant-growing supports may be used either singly or in a combination of two or more species thereof, as desired.

When a plant is grown by using the water-retaining support according to the present invention, the water-retaining support according to the present invention comprising a hydrogel or polymer may preferably be mixed with the above-mentioned other plant-growing support comprising soil, etc., at a mixing ratio of about 0.1 to 10 wt. % (more preferably about 0.3 to 3 wt. %) in terms of weight percent in a dried state.

When the water-retaining support according to the present invention and the other plant-growing support are used in combination, they may be used as the above-mentioned mixture, and may also be used in an embodiment wherein at least one layer comprising the water-retaining support according to the present invention may be disposed on the surface of and/or in the inside of the other plant-growing support.

Method of Cultivating Plant Using Hydrogel-Forming Polymer

In the conventional cultivation using an open-type vessel (such as pot, cell tray, and planter), the amounts of water and the nutrient concentration are drastically changed before and after the watering, whereby it is difficult to control water. Immediately before the watering, the obstruction to the root due to the high concentration of the fertilizer in the soil caused by drying becomes problematic, and the wilting of a plant due to the shortage of water becomes problematic. On the other hand, immediately after the watering, the residence or retention of excess water in the pot, and the root decay due to the shortage of oxygen become problematic. Particularly, in view of the extreme increase in the fertilizer concentration immediately before the watering, it is necessary to set the absolute amount of the fertilizer to a low level so as to avoid the extreme increase thereof, and such a low level may cause the suppression of the inherent growth of the plant.

The production of plantlets with a cell-type partition such as vegetables for which the demand has drastically been increasing in recent years, also holds the above-mentioned problem. In the case of such plantlets with a cell-type partition, since each cell or division has a relatively small volume, and therefore the nutrient concentration and water content are liable to be changed drastically, thereby to make it difficult to uniformly control the individual cells.

In the present invention, such a problem of the physical environment around the plant root may be represented by the above-mentioned pF value (water absorption pressure). A plant may absorb water having a pF value of about 2.8 or less, but water having a pF value of 2.3 or less is preferred in view of favorable growth of a plant. Water having a pF value of 1.8 or less can be absorbed by a plant, but it is gravitational water and has a strong possibility of flowing out of the rhizosphere (or zone under the influence of the root). On the other hand, when the drainage of the rhizosphere is poor, the water may reside around the root, thereby to cause the root decay.

According to the present inventors' knowledge, it is presumed that the root of a plant which has been cultured by the conventional method is not acclimated, and the new support (such as bark) to be used in the step of farm cultivation and the root do not sufficiently fit with each other (the contact area therebetween is small), whereby the absorption of the nutrient and water necessary for the initial growth of the plant is insufficient. According to the present inventors, it is also presumed that the decrease in the germination ratio of seeds and the growth inhibition after the germination are caused by the small contact area between the support and the seed or the root after the germination. When a cultured plantlet with a root is transferred to farm cultivation, the conventionally used support is too hard or does not have a fluidity, thereby to damage the root. In addition, when the conventional support is used, it is impossible to use the insertion transplantation technique.

On the other hand, when the hydrogel-forming polymer according to the present invention is used, a large amount of water may be secured per unit volume, whereby the range of fluctuation in the nutrient concentration in a vessel becomes small and the inhibition of plant elongation is dramatically decreased. Further, since the hydrogel-forming polymer according to the present invention may completely absorb an excess of water, the root is less liable to decay, and the control of the nutrient and water becomes easier. Particularly, since the range of fluctuation in the nutrient concentration before and after the watering is decreased, the absolute amount of a fertilizer may be increased drastically, thereby to further accelerate the growth of the plant. Therefore, according to the present invention, it becomes easy to uniformly control the individual cells even in the case of the production of the plantlets with a cell-type partition wherein the vessel has a relatively small volume.

In addition, a plant immediately after the transplanting, a seed, and a root after germination may more easily fit with the hydrogel-forming polymer (the contact area therebetween is increased), thereby to smoothly conduct the initial growth of the plant. Further, since the hydrogel comprising the hydrogel-forming polymer according to the present invention is relatively soft and has a good fluidity, a root may be transplanted therein without being damaged. Due to such a characteristic of the hydrogel, the insertion transplantation becomes easier. While such genera of orchids as Phalaenopsis and Cymbidium, particularly, have thick roots with substantially no root hair, the present invention makes it very easy to transplant such plant species as well.

Method of Preventing Flowing-out of Support

When a vessel is one having an open-type basement, it is important to prevent the flowing-out of a support (such as hydrogel and planting material including the hydrogel) due to watering, etc. As the means for preventing such flowing-out, it is effective to enlarge the particles of the hydrogel-forming polymer or increase the stickiness thereof. As a method of increasing the stickiness, it is possible to use a method of reducing the crosslinking density of the hydrogel-forming polymer, etc.

Method of Suppressing Rising of Plant

In the case of a plant species with a thick and strong root, when the root elongates and reaches the bottom face of a vessel, the plant may be lifted up to the upper portion of the vessel (so-called "rising" phenomenon). As the means of preventing such a phenomenon, it is effective to increase the stickiness of the hydrogel-forming polymer. As the method of increasing the stickiness, it is possible to use a method of reducing the crosslinking density of the hydrogel-forming polymer, etc.

Support for Plant Factory

Heretofore, in a so-called "plant factory" (plant-growing system under an artificial environment other than the natural environment such as field cultivation), cultivation using mist, cultivation using capillary watering, etc., have been effected, and these methods have required an enormous amount of investment for the watering equipment.

When the hydrogel-forming polymer according to the present invention is used as a plant support or water-supplying medium for such a "plant factory," the watering equipment is simplified, thereby to simplify the plant-growing system and reduce the costs therefor.

Field Cultivation

The conventional field cultivation has been encountered with problems similar to those in the conventional cultivation using a vessel. That is, the field cultivation is affected by conditions of nature, and therefore the nutrient concentration, water content, and pF value are drastically changed before and after rainfall, thereby to make it difficult to cultivate the plant. Particularly, areas with less rainfall have often been encountered with damages such as drought.

In contrast, when the hydrogel-forming polymer according to the present invention is used for the field cultivation, since the hydrogel-forming polymer functions as a buffer against the drastic fluctuations in the nutrient concentration, water content, and pF value, etc., as described above, the plant may be cultivated under a milder condition.

Virescence Technology with respect to the virescence (or greening) of desert, virescence of slopes, virescence of wall surfaces, etc., since the basic support is sand, soil or clay wall, concrete, etc., the amount of water retained therein is very small, and the water-retaining ability thereof is very poor. For the purpose of smoothly effecting the initial stage of plant growth or seed germination from such a state, it is quite effective to use the hydrogel-forming polymer according to the present invention having a very great water-retaining ability and acting as a buffer against the drastic fluctuations of the nutrient concentration, water content, pF value, etc.

For the virescence of slope, it is possible to sow seeds for virescence by a fluid seeding method using the hydrogel-forming polymer according to the present invention in the same manner as in the technique for spraying a concrete material onto a slope. Particularly, in the case of the virescence of a slope or non-flat hillside wherein rocks, etc., are exposed to the ground surface thereof, the attachment ratio of a net and seeds onto the slope tends to become lower when a technique such as net seeding is used. When the fluid seeding method for virescence seed using the hydrogel-forming polymer according to the present invention is used, the seeds contained in the hydrogel may uniformly be sprayed onto a slope, and the attachment ratio of the hydrogel and the seeds contained therein with respect to the slope is increased, thereby to enhance the germination rate of the seeds and accelerate the growth of the plant after the germination.

Spatial Cultivation

An epiphyte such as Vanda, which is a genus of orchid family plant, is attached to a tree, etc., in a natural state, while hanging down its roots into a space, thereby to absorb water of fog, rain, etc. When such a plant species is artificially cultivated in a space, it is necessary to increase the frequency of watering so as to prevent drying. In such a case, when the epiphyte is cultivated while covering the periphery of the roots thereof with the hydrogel-forming polymer according to the present invention, the drying thereof may be prevented for a long period of time, and the frequency of the watering may be reduced.

Spatial Floating Cultivation Under Weightlessness

With the advent of the age of population growth and food shortage, plant cultivation in the outer space has been under investigation. Since the outer space is weightless, when a plant support mainly comprising a hydrogel-forming polymer is floated in a weightless space such as a space station, and the support is planted with a plant so as to cultivate the plant, three-dimensional cultivation can be conducted, thereby to drastically increase the plant production per unit volume.

Method of Transplanting Plant

When a plant is transplanted together with the hydrogel-forming polymer according to the present invention attached to its roots, the initial drying may be prevented, thereby to increase the ratio of taking root and to enhance the initial growth of the plant. Such a transplanting method is particularly effective in transplanting plantlets of flower and vegetable, and woody plantlets, transplanting turf, moving adult trees, etc.

Method of Shrinking Swollen Hydrogel-Forming Polymer

A hydrogel-forming polymer comprising a polymer having a carboxyl group in a swollen state (gel state) in water may drastically be shrunk by adding thereto a high concentration of calcium solution or calcium salt powder. Examples of the use and application of such "gel shrinkage" will be explained in the following.

(1) When a tissue-cultured plant is transferred to farm cultivation, a sugar becomes a cause of germ propagation. Therefore, calcium is added to a gel to shrink the gel, and the sugar in the gel is removed by decantation, washing with water, etc.

(2) When a large amount of water is present around a plant such as plantlet at the time of its shipping, the root would be damaged during the transportation. Further, the large amount of water makes the goods heavier, thereby to increase the cost of the transportation. For the purpose of preventing these problems, calcium is added to a gel so as to shrink the gel, thereby to remove the water in the gel.

(3) In order to increase the contact area between a new support and roots when a plant is transplanted, calcium is added to a gel so as to shrink the gel, and thereafter the new support is disposed around the roots thereby to smoothly effect the transplantation.

(4) When a plant grown in a vessel is transplanted, calcium is added to the gel so as to shrink the gel and to reduce its volume, and water is released from the gel, thereby to facilitate the removal of the plant from the vessel.

Method of Suppressing Propagation of Algae, etc.

Since algae which have been propagated in the upper portion of a pot, etc., absorbs a nutrient supplied to a plant for the purpose of growing the plant, it is desirable to suppress the propagation of such algae as firm as possible. Examples of the suppressing method usable in this case are as follows:

(1) Covering the surface of the water-retaining support for plant with a light-shielding sheet such as aluminum.

(2) Sprinkling the surface of the water-retaining support for plant with light-shielding activated charcoal.

(3) Blackening the hydrogel-forming polymer itself by using a pigment, etc.

Additives

In the crosslinked structure of the hydrogel-forming polymer constituting the plant-cultivating support, soil-improving agent, vessel or sheet according to the present invention, at least water is retained as desired, so as to form a hydrogel. Further, it is also possible to add another additive to the hydrogel as desired. As the additive to be incorporated into the inside of the hydrogel or polymer for such a purpose, it is possible to use known additives which may ordinarily be used in the usual plant cultivation in open-air field or facilities (such as greenhouse) without particular limitation.

Specific examples of such a known additive may include: various nutrients for a plant, agents participating in the cultivation of a plant other than the nutrients (such as plant growth-regulating substance, plant form (or shape)-regulating substance including a dwarfing agent) or agricultural chemicals (such as weed killer, insecticide, and bactericide).

Nutrient

Specific examples of the nutrient which may be introduced, as desired, into the inside of the hydrogel or hydrogel-forming polymer according to the present invention may include major elements such as N, P, K, Ca, Mg and S and/or minor elements such as Fe, Cu, Mn, Zn, Mo, B, Cl and Si.

As the method of incorporating such a nutrient into the hydrogel or hydrogel-forming polymer, it is possible to use a method wherein the above hydrogel or hydrogel-forming polymer itself is immersed in an aqueous solution containing a substance such as urea, calcium nitrate, potassium nitrate, potassium hydrogen phosphate, magnesium sulfate, and ferrous sulfate to be swollen, thereby to cause the resultant hydrogel or hydrogel-forming polymer to absorb thereinto the desired nutrient.

Plant-growth regulating substance, etc.

It is also possible to incorporate into the above-mentioned hydrogel or hydrogel-forming polymer the above-mentioned plant growth-regulating substance, plant form-regulating, etc., or agricultural chemicals (such as weed killer, insecticide, and bactericide) as desired, which is a substance participating in the cultivation of the plant other than the above-mentioned nutrients.

Method of Incorporating Additive

As the method of incorporating one of the above various additives into the inside of the hydrogel or hydrogel-forming polymer, it is possible to use a method wherein the hydrogel or hydrogel-forming polymer is immersed in an aqueous solution of the additive so that the hydrogel or polymer is caused to absorb the above aqueous solution, thereby to prepare a hydrogel or hydrogel-forming polymer. Further, when a plant form-regulating substance (dwarfing agent) such as inabenfide or uniconazole which has a very low solubility in water is used, it is also possible to incorporate the plant form-regulating substance into the inside of the hydrogel or hydrogel-forming polymer by using an organic solvent which is capable of dissolving the plant form-regulating substance and is capable of swelling the hydrogel or polymer, whereby the plant form-regulating substance may be incorporated into the inside of the hydrogel or polymer in a practically usable concentration.

Plant Growth in Semi-closed Ecosystem

In the natural world, there works a material circulation ecosystem wherein plants perform photosynthesis, animals eat the plant, microorganisms decompose the excrements of animals and the corpses of animals and plant, and the plants absorb the resultant decomposition products as nutrients. On the other hand, the crop cultivation consuming a large amount of chemical fertilizers, agricultural chemicals, etc., may be called a semi-closed ecosystem since the material-circulating function of organisms is suppressed therein. The clonal plantlet production by aseptic culture and the vegetable production in plant factories, which have recently been commercialized, may be called a closed ecosystem since they block up the microorganism phase. It is expected that the plant cultivation in a closed ecosystem which is independent of fluctuations in the natural environment and may be artificially controlled, further magnifies its importance in the future.

By utilizing the bacteriostatic action of the hydrogel-forming polymer (see PCT/JP95/01223), the present invention enables plant production in a semi-closed ecosystem wherein a plant is cultivated while the material circulation caused by the microorganic decomposition is suppressed. This method has a merit such that not only the propagation of germs such as pathogenic microbes capable of preventing the growth of a plant may be suppressed, but also the oxygen consumption due to microorganisms in the support is decreased, thereby to secure a large absolute amount of oxygen which may be absorbed by the root of the plant. Further, the microorganism phase may be simplified, such that a plant is grown while only the microorganisms effective for the plant (e.g., vasicular arbuscular mycorrhiza) are propagated.

With the advent of the age of population growth and food shortage, the plant production in the outer space has become very important, and the plant production in a closed ecosystem excluding or simplifying the microorganism phase would prevail in spaces such as space stations. Even in the plant cultivation in such an outer space, the hydrogel-forming polymer according to the present invention may preferably be used as a support for plant.

Plant Cultivation in Home

In order to cultivate a plant in a home, it is particularly important that the vessel containing a support may be maintained in a clean state and that nutrients and water may be supplied easily. Since the hydrogel-forming polymer attached to the vessel according to the present invention has a bacteriostatic action (see PCT/JP95/01223), it may easily maintain a clean state. Further, since the polymer may retain a large amount of nutrients and water, the frequency of watering may be reduced, and appropriate nutrient concentration, water content, pF value, etc., may be maintained for a long period of time. It is also possible to place a plant body such as seed in this vessel from the beginning advance.

Plant-Growing Vessel/Sheet

Hereinbelow, there is described an embodiment wherein the hydrogel-forming polymer according to the present invention is applied to a plant-growing vessel or sheet. Such a growing vessel or sheet may preferably be used for the germination of a seed or growth thereof after the germination (hereinafter, the term "growth" is used in a meaning such that it also includes germination and growth after the germination) in tissue culture or farm cultivation, and for the growth of a plant.

In this embodiment, the transplanting operation for a plant (hereinafter, the term "plant" is used in a meaning such that it also includes "seed") may easily be effected, the germination or growth of the plant may be accelerated, and the necessity for strict water control, etc., may greatly be alleviated.

The plant-growing vessel in such an embodiment comprises a vessel-shaped substrate which is capable of accommodating therein at least a portion of a plant; and a hydrogel-forming polymer disposed in the inside of the vessel-shaped substrate, which has a crosslinked structure.

Further, the plant-growing sheet in such an embodiment comprises a sheet-shaped substrate; and a hydrogel-forming polymer disposed on at least one side of the surface of the substrate, which has a crosslinked structure.

In the above-mentioned vessel or sheet according to the present invention, the hydrogel-forming polymer having a crosslinked structure may preferably be a polymer which shows a decrease in water absorption magnification along with an increase in temperature within a temperature range of not lower than 0° C. and not higher than 70° C., and exhibits a water absorption magnification which is reversibly changeable with respect to temperature.

Further, in the present invention, when the above hydrogel-forming polymer is in the form of powder or particles, the powder or particles may preferably have a dimension or size of about 0.1 $\mu$m to 5 mm in a dry state thereof.

Function of Vessel or Sheet

When the plant-growing vessel or sheet according to the present invention is used, the above-mentioned problem encountered in the prior art may be solved on the basis of the function peculiar to the vessel or sheet according to the present invention as described hereinbelow.

More specifically, a polymer capable of providing a hydrogel having a crosslinked structure is disposed on the inner wall of the plant-growing vessel according to the present invention (or on the side of the sheet according to the present invention, on which a plant is to be disposed, when such a sheet is disposed on the inner wall of another vessel) by coating, etc. Accordingly, when a plant is put into the vessel and then the vessel is filled with water or a suspension culture medium, the above-mentioned hydrogel-forming polymer absorbs water so that the volume thereof is increased remarkably, and occupies the inner space of the vessel, whereby the polymer functions as at least a part of the support for the plant (in other words, the hydrogel-forming polymer functions as such a support, or promotes the function for supporting the plant).

In the present invention, on the basis of the function peculiar to the above-mentioned which is capable of providing a hydrogel and has a crosslinked structure, the problems encountered in the prior art at the time of the transplanting of a plant are solved. More specifically, such problems to be solved may include: one such that when a plant is transferred into a vessel after the vessel is filled with a solid plant support in advance, the root of the plant does not enter the inside of the support well, and therefore the resultant workability is decreased, and the root per se is also damaged; one such that when a plant is put into a vessel and then the conventional solid plant support is charged into the vessel, the resultant initial growth is decreased due to a small contact area between the root of the plant and the support; etc.

In addition, in an embodiment of the present invention wherein the hydrogel-forming polymer to be disposed on the inner wall of the vessel by coating comprises a hydrogel-forming polymer wherein the water absorption magnification is decreased along with an increase in temperature in the temperature range of not lower than 0° C. and not higher than 70° C., and the change in the water absorption magnification is reversible with respect to temperature, for example, it is possible that a plant is put into such a vessel, water or a suspension culture medium is poured into the vessel so that the polymer is caused to absorb water, whereby the polymer is swollen so as to occupy the inner space of the vessel and the plant is grown by using the hydrogel-forming polymer as (at least a part of) the support of the plant. After the plant is grown, when the temperature of the support is elevated, the hydrogel-forming polymer is de-swelled (or shrunk) so as to markedly decrease its volume, and therefore the grown plant may easily be removed from the vessel.

Accordingly, the present invention solves the above-mentioned problems encountered in the prior art, i.e., one such that since the thickly grown root presses the wall surface of the vessel, a considerable period of time is required in order to take out the plant from the vessel, and such an operation damages the root.

Further, the plant-growing vessel or sheet according to the present invention having the above-mentioned structure can solve the above-mentioned problems on the basis of the function peculiar to such a vessel or sheet, as described hereinbelow.

A polymer capable of providing a hydrogel having a crosslinked structure is disposed on the inner wall of the vessel or sheet according to the present invention by coating, etc. When the support (such as soil) in the neighborhood of the inner wall of the vessel assumes a water-excessive state for the above-mentioned reason, the polymer absorbs water and becomes a hydrogel state. On the other hand, when the support in the neighborhood of the inner wall of the vessel assumes a water-deficient state, the hydrogel particles have a function of transferring water therefrom into the support. As a result, the environment for water in the rhizosphere in the neighborhood of the inner wall of the vessel is maintained almost constant, and the problems encountered in the prior art are solved.

Particularly, in an embodiment of the present invention wherein the above hydrogel-forming polymer comprises a hydrogel-forming polymer wherein the water absorption magnification is decreased along with an increase in temperature in the temperature range of not lower than 0° C. and not higher than 70° C., and the change in the water absorption magnification is reversible with respect to temperature, the polymer absorbs water from the support when the temperature becomes lower, while the polymer discharges water into the support when the temperature becomes higher. In other words, the water content in the support in the neighborhood of the sheet or the wall of the vessel is increased as the temperature becomes higher. In general, it is considered that a plant demands a smaller amount of water when the temperature is low (below about 5–20° C.), and demands a larger amount of water as the temperature becomes higher (about 20–35° C.). It is also considered that the excessive water content at a low temperature invites a root decay phenomenon, and the deficient water content at a high temperature invites growth inhibition. Accordingly, when the above-mentioned vessel or sheet having a hydrogel-forming polymer disposed therein is used, the environment in the rhizosphere is maintained more suitably, thereby to promote the growth of the plant more effectively.

In addition, the hydrogel-forming polymer disposed on the inner wall of the plant-growing vessel (or on the sheet to be disposed on the inner wall of the vessel) has a function of storing water content and/or nutrients in the crosslinked structure of the polymer as described above. Therefore, the storing function which has been performed by the "space" in the conventional growing vessel, may be performed by the above polymer extremely effectively in place of the above space. Therefore, according to the present invention (even when the ability of the growing vessel for storing water content and nutrients is retained constant), the internal volume of the vessel can be reduced remarkably.

As described above, according to the present invention, the volume of a vessel which has been considered to be "appropriate" in the prior art can be reduced remarkably, and further the originating power of the root can be improved due to an increase in the opportunity for the mechanical contact stimulus. Further, on the basis of the reduction in the internal volume of the vessel per se, it is also possible to reduce the area to be used for growing a plant, to reduce the amount of the material for the growing vessel, and to reduce the transporting costs, etc. In addition, in combination with the above-mentioned labor saving in the water control, remarkable cost reduction can be accomplished.

Further, since the conventional vessel for home use has a lower portion of an open-system, and an excess of water is discharged from the open-system lower portion at the time of the watering, etc., a "receiving pan" must be used simultaneously with the vessel. The use of such a pan is troublesome and it is liable to impair the beautiful appearance of the system.

On the contrary, in the plant-growing vessel according to the present invention, since the water-storing ability is imparted to the wall surface of the vessel, it is not necessarily required to provide an opening portion at a lower part of the vessel. In other words, the opening portion of the vessel is omissible in the present invention. When the vessel having a closed-type lower portion is used, the problems encountered in the conventional vessel for home use (having an open-system lower portion) are easily solved.

In the above, the growth of a plant after the germination thereof has mainly been described, but the vessel or sheet according to the present invention is also suitably applicable to the germination of a seed or the growth thereof after the germination.

Shape of Hydrogel or Hydrogel-forming Polymer

The shape or form of the hydrogel or hydrogel-forming polymer to be disposed in the inside of the vessel according to the present invention is not particularly limited, but may appropriately be selected depending on the kind of a plant, growth method therefor, etc. Specific examples of the shape of the hydrogel or polymer may comprise various shapes such as layer-like shape, micro-bead-like shape, fiber-like shape, film-like shape, and indeterminate shape.

The dimension or size of the hydrogel or polymer in the present invention may appropriately be selected depending on the kind of the plant, cultivation method therefor, etc. In order to enhance the water-absorbing rate for the hydrogel-forming polymer, it is preferred to increase the surface area of the hydrogel or hydrogel-forming polymer per unit volume thereof, that is, to decrease the dimension of one object (e.g., one particle) of the hydrogel or hydrogel-forming polymer. For example, the dimension or size of the hydrogel or polymer in the present invention may generally be in the range about 0.1 $\mu$m to 1 cm, more preferably in the range about 1 $\mu$m to 5 mm (particularly about 10 $\mu$m to 1 mm), in a dried state thereof.

In the hydrogel or polymer according to the present invention, the above-mentioned "dimension in a dried state" refers to the average of maximum diameters (maximum dimensions) of the hydrogel or polymer (average of values obtained by measuring at least 10 objects). More specifically, e.g., the following dimension may be treated as the "dimension in a dried state" according to the shape of the above hydrogel or hydrogel-forming polymer.

Micro-bead shape: particle size (average particle size);

Fiber shape: average of lengths of respective fiber-like pieces;

Film shape, indeterminate shape: average of maximum dimensions of respective pieces; and Layer shape: thickness of a polymer layer.

In the present invention, in place of the above "average of maximum values", it is also possible to use the diameter of a "ball" having a volume equal to the average of the volumes of respective pieces (average of values obtained by measuring at least 10 pieces) as the "dimension in a dried state" of the particles of the above hydrogel or hydrogel-forming polymer.

Method of Shaping Hydrogel or Polymer

The method of shaping of the hydrogel or hydrogel-forming polymer according to the present invention is not particularly limited. AS such a method, it is possible to use an ordinary method of shaping a polymer depending on the desired shape of the hydrogel or polymer.

When the simplest method is used, a monomer for providing the water-soluble or hydrophilic polymer, the above-mentioned multi-functional monomer (such as bifunctional monomer), and a polymerization initiator are dissolved in water, and the monomer, etc., is polymerized by use of heat or light, whereby a hydrogel or hydrogel-forming polymer may be prepared. The resultant hydrogel or hydrogel-forming polymer is mechanically crushed or pulverized, the unreacted monomer, the remaining polymerization initiator, etc., are removed therefrom by washing with water, etc., and thereafter the resultant product is dried, thereby to provide a hydrogel-forming polymer for constituting the vessel or sheet according to the present invention.

Further, when the monomer for providing the water-soluble or hydrophilic polymer is liquid, the multi-functional monomer and polymerization initiator are added into the monomer, the monomer is polymerized by bulk polymerization by use of heat or light, the resultant product is mechanically crushed, the unreacted monomer and the remaining multi-functional monomer are removed therefrom by extraction with water, etc., and the product is dried, whereby a hydrogel or hydrogel-forming polymer according to the present invention may be provided.

On the other hand, when the hydrogel or polymer according to the present invention in a micro-bead shape is intended to be prepared, it is possible to use an emulsion polymerization method, a suspension polymerization method, a precipitation polymerization method, etc. In view of the control of the resultant particle size, a reverse-phase suspension polymerization method may particularly preferably be used. In the reverse-phase suspension polymerization method, as a dispersion medium, an organic solvent (e.g., saturated hydrocarbon such as hexane) which does not dissolve the monomer and the resultant polymer is preferred. In addition, it is also possible to use a surfactant (e.g., a nonionic surfactant such as sorbitan fatty acid ester) as a suspension auxiliary in combination with the above organic solvent.

The particle size of the resultant micro-bead may be controlled by the kind or amount of the surfactant to be added, the stirring speed, etc. As the polymerization initiator, either of a water-soluble polymerization initiator, and a water-insoluble polymerization initiator may be used.

When the hydrogel or polymer according to the present invention is formed into a fiber shape, film shape, etc., e.g., it is possible to use a method wherein an aqueous solution of a water-soluble polymer is extruded into an organic solvent which is unmixable with water by using a die, etc., to form each of the predetermined shapes, and then the resultant product is irradiated with light, electron beam, γ-ray, etc., so as to impart a crosslinked structure to the polymer. Further, it is also possible to use a method wherein the above water-soluble polymer is dissolved in an organic solvent or water, is shaped by a solvent casting method, and then is irradiated with light, electron beam, γ-ray, etc., so as to impart a crosslinked structure to the polymer.

In general, the crop cultivation under high-temperature and over-humidity condition is liable to cause a phenomenon such as stem spindly growth, or branching or blooming defectiveness, so as to lower the value of the agricultural products. Further, the problem of such a value decrease can also occur in some cases, depending on the character of the race of the plant. In such a case, it is preferred to use a dwarfing agent having an effect of suppressing the extension of the stem, etc., so as to promote the branching and blooming, as desired. In the present invention, in an embodiment using the hydrogel-forming polymer having a crosslinked structure may preferably be a polymer which shows a decrease in water absorption magnification along with an increase in a temperature range of not lower than 0° C. and not higher than 70° C., and exhibits a water absorption magnification which is reversibly changeable with respect to temperature, when the dwarfing agent is incorporated into the inside of the hydrogel or polymer, the plant-cultivating support, soil-modifying agent, vessel, or sheet comprising the resultant hydrogel or polymer as a constitution element thereof discharges therefrom the dwarfing agent to the outside (e.g., into soil) at a high temperature so as to suppress the stem elongation of the plant. On the other hand, at a lower temperature at which the demand for the dwarfing agent becomes low, the dwarfing agent is not discharged from the hydrogel or polymer, and therefore persistence of the effect of the dwarfing agent is improved remarkably.

In general, the necessity for a weed killer also becomes greater at a high temperature as compared with that at a low temperature. Accordingly, when the weed killer is incorporated into the hydrogel or polymer according to the present invention, the effect of the weed killer and the persistence thereof are remarkably improved on the basis of the same storage-discharge mechanism as described above.

Shape and Material of Vessel/sheet

The shape of the plant-growing vessel according to the present invention is not particularly limited as long as the above-mentioned "hydrogel-forming polymer having a crosslinked structure" is disposed inside thereof, but may be formed into one of known various shapes such as cotyle-type, pot-type, planter-type, tray-type, etc.

The schematic sectional view of FIG. 1 shows an embodiment (pot-type) of the growing vessel according to the present invention. Referring to FIG. 1, a layer 2 comprising a "hydrogel-forming polymer having a crosslinked structure" is disposed in the inside of a pot-type vessel 1 having a bottom 1a and a side wall portion 1b. Of course, it is possible that one or more holes (not shown) may be provided in the bottom 1a or side wall portion 1b as desired.

Similarly, the shape of the plant sheet according to the present invention is not particularly limited as long as the above-mentioned "hydrogel-forming polymer having a crosslinked structure" is disposed on the surface of at least a portion thereof, but may be formed into one of various kinds of known shapes.

Figure 2:
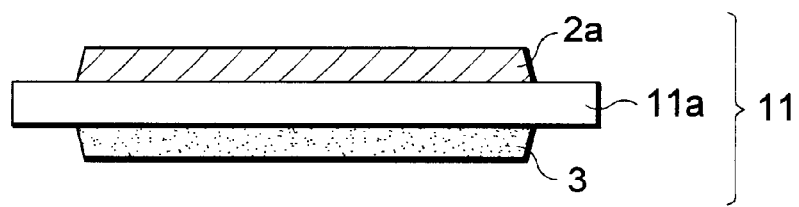
FIG. 2 is a schematic perspective view showing an embodiment of the plant-growing sheet according to the present invention.

The schematic sectional view of FIG. 2 shows an embodiment of the growing sheet according to the present invention. Referring to FIG. 2, a layer 2a comprising a "hydrogel-forming polymer having a crosslinked structure" is disposed on one of the surfaces of a sheet base material 11a. On the surface (back) of the sheet base material 11a disposed opposite to the face on which the polymer layer 2a is disposed, a layer 3 comprising a sticking agent or adhesive (comprising carboxymethyl cellulose (CMC), etc.) may be disposed as desired.

Figure 3:
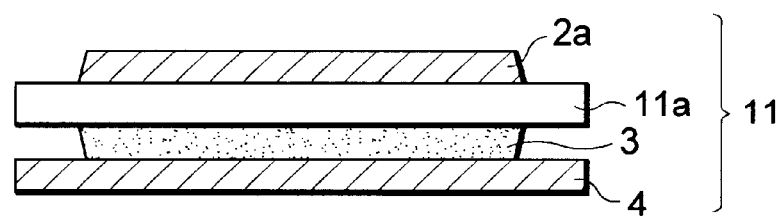
FIG. 3 is a schematic perspective view showing another embodiment of the plant-growing sheet according to the present invention.

Further, as shown in FIG. 3, a sheet 4 having a releasing property may be disposed on the sticking agent/adhesive layer 3 as desired. When the sheet 11 of such an embodiment as shown in FIG. 3 is used, the sheet 11 may easily be placed at a desired location of a conventional vessel (not shown) by tearing off the releasing sheet 4, and thereafter disposing the sheet 11 in the conventional vessel.

The sheet according to the present invention may be formed into a shape having a partition (internal dividing wall) as desired.

Figure 4A:
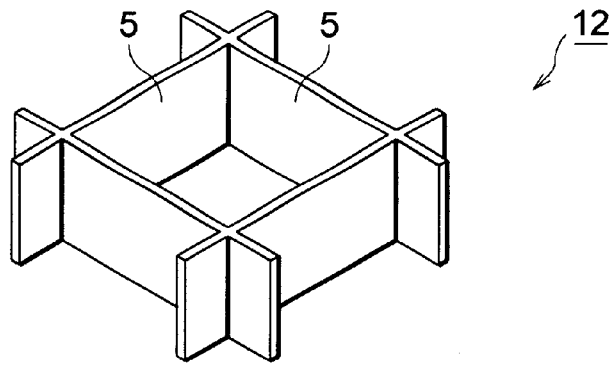
FIGS. 4A and 4B are schematic perspective views showing other embodiments (partition-type) of the plant-growing sheet according to the present invention.
Figure 4B:
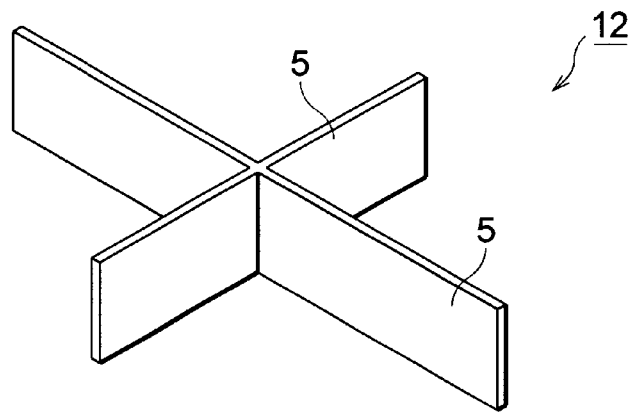

The schematic perspective views of FIG. 4A to FIG. 4B show an example of the embodiment of the sheet according to the present invention having a partition. FIG. 4A shows an example of the single cell-type partition form (with an extension portion), and FIG. 4B shows an example of the 4 (four) cell-type partition form. The number of the "cell" to be formed by these partitions is not particularly limited, but may preferably be about 1–10000 (more preferably about 10–1000) in view of efficient utilization or efficiency of the cultivating area. In these partition-type sheet 12 according to the present invention, the layer (not shown) comprising the "hydrogel-forming polymer having a crosslinked structure" is disposed on at least a portion of the surface 5 of the partition on which a plant is to be disposed.

Figure 5:
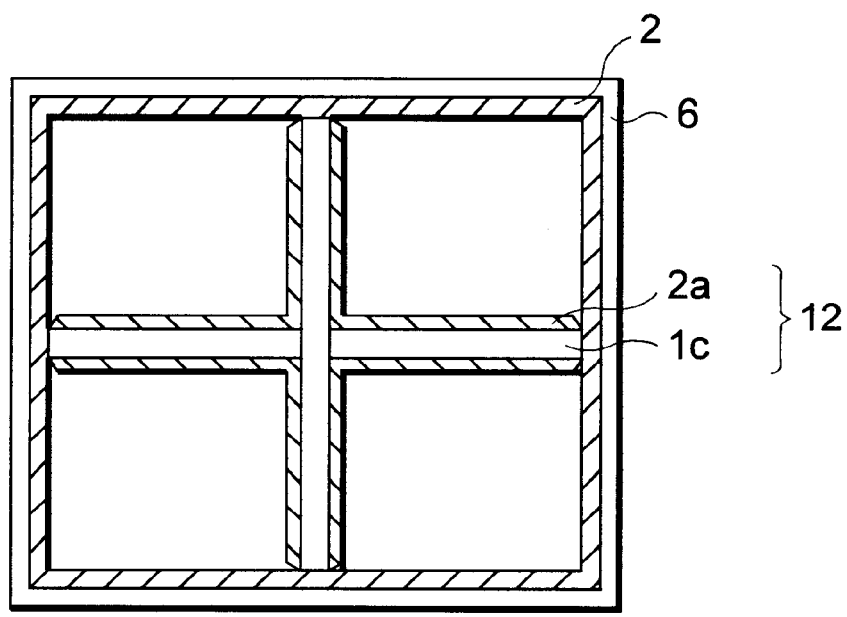
FIG. 5 is a schematic plan view showing a case wherein the partition-type sheet according to the embodiment of FIG. 4B is used in combination with another vessel.

As shown in the schematic plan view of FIG. 5, when the partition-type sheet 12 according to the present invention is used in combination with "another vessel" 6 (conventional vessel is also usable), the removal of a plant at the time of the transfer thereof becomes very easy by utilizing the attachment and detachment between the sheet 12 and the other vessel 6. In other words, when the grown plant (not shown) is intended to be removed from the vessel 6 or sheet 12, the removal of the plant becomes extremely easy by pulling out the partition 12 from the vessel 6 in advance. The above-mentioned other vessel 6 may also be a conventional vessel, or a plant-growing vessel (i.e., vessel according to the present invention) wherein a layer 2 of the "hydrogel-forming polymer" is disposed in the inside thereof as desired.

The material for the vessel or sheet according to the present invention is not particularly limited, but may appropriately be one of known materials such as ceramic or earthenware (unglazed pottery), metal, wood, plastic, and paper.

Embodiment of Polymer Arrangement

In the present invention, the location, area, shape (e.g., either of an intermittent layer or continuous layer), or means of disposing the hydrogel-forming polymer is not particularly limited as long as the polymer is disposed in the inside of the growing vessel.

The location of the above-mentioned polymer disposed in the vessel may for example be either of the bottom face 1a or the side face 1b (FIG. 1) of the vessel, but the polymer may preferably be disposed on the side face 1b of the vessel in view of easiness in retaining the plant by the swelling of the polymer.

In the present invention, in order to effectively exhibit the function of the hydrogel-forming polymer, when the area of internal surface of the vessel (or the area of one of the side surfaces of a sheet) is denoted by Sa, and the area on which the hydrogel-forming polymer has been disposed is denoted by Sp, the ratio (Sp/Sa)×100 of these areas may preferably be about 10% or more, more preferably about 50% or more (particularly about 70% or more).

Figure 6A:
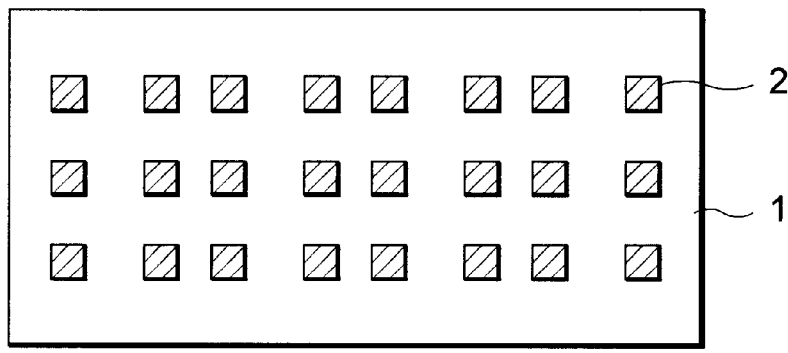
FIGS. 6A and 6B are schematic plan views showing examples of the embodiment wherein a hydrogel-forming polymer is disposed in the form of an intermittent layer on a substrate.
Figure 6B:
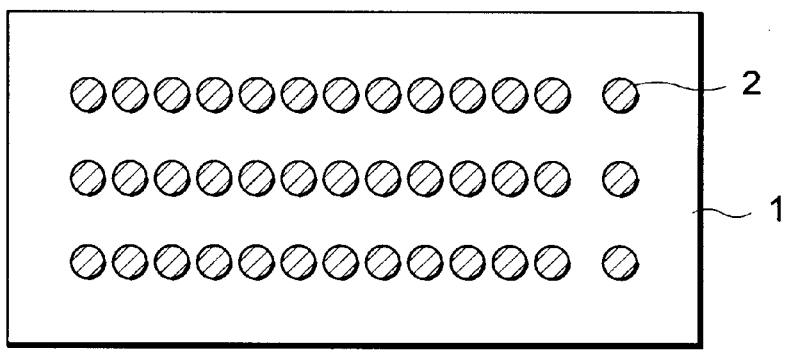

In the present invention, the layer 2 or 2a of the hydrogel-forming polymer may be a continuous layer or an intermittent layer. Such an intermittent layer may easily be formed by an arbitrary measure such as screen printing. When the intermittent layer is intended to be formed, the plan shape thereof may be an arbitrary shape such as checkered pattern-type as shown in FIG. 6A, and spot-type as shown in FIG. 6B.

Figure 7A:
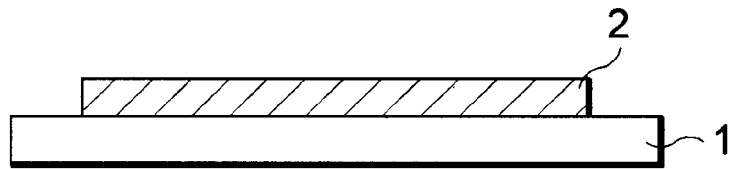
FIGS. 7A, 7B and 7C are schematic sectional views showing examples of the embodiment wherein a hydrogel-forming polymer is disposed on the substrate of a vessel or sheet in the present invention.
Figure 7B:
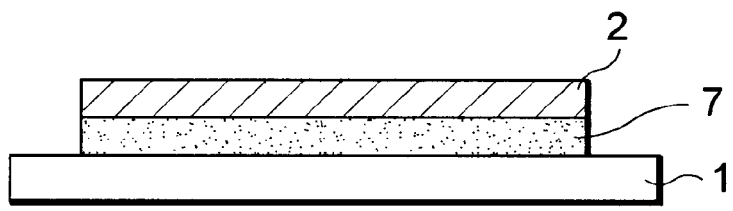
Figure 7C:
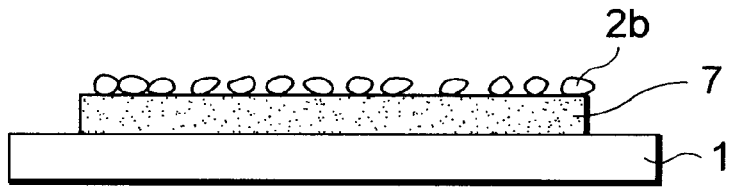
Figure 8:
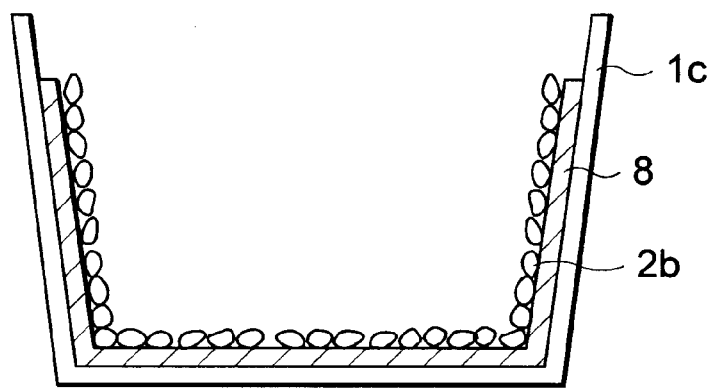
FIG. 8 is a schematic sectional view showing an example of the actual embodiment of the plant-growing vessel according to the present invention.
Figure 9:
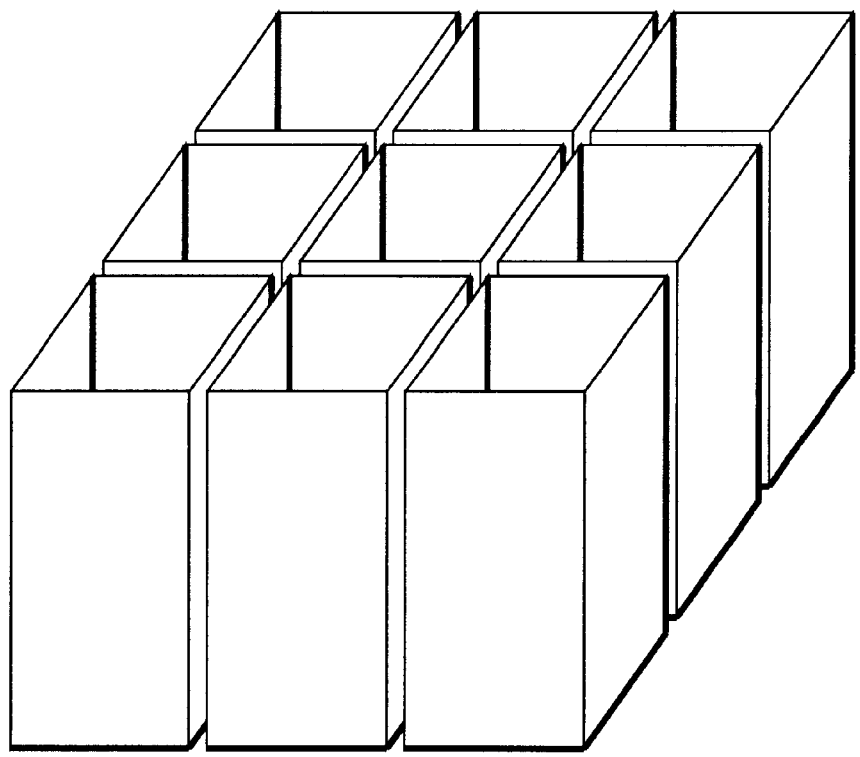
FIG. 9 is a schematic perspective view showing an example of the actual embodiment of the plant-growing sheet (partition-type) according to the present invention.
Figure 10:
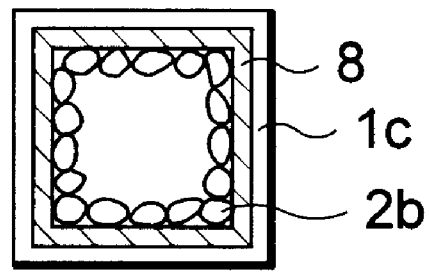
FIG. 10 is a schematic plan view showing one division of the partition-type sheet of FIG. 9 as viewed from the above.
Figure 11:
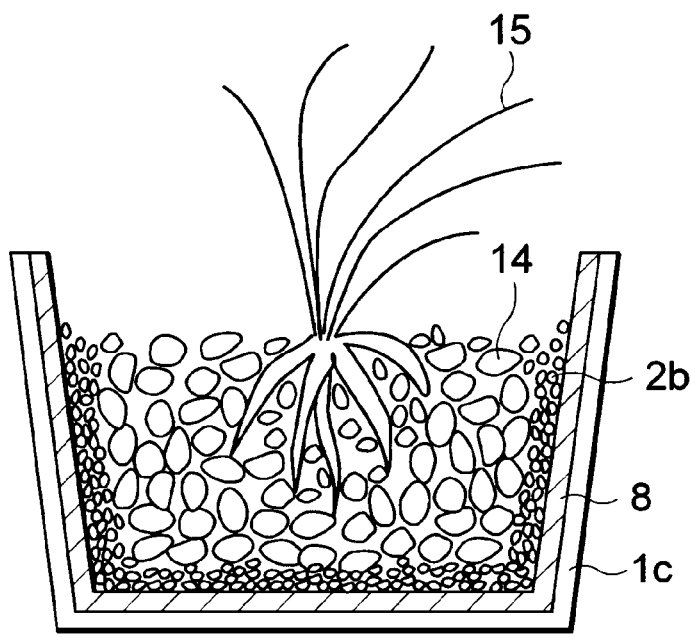
FIG. 11 is a schematic sectional view showing an embodiment wherein a support and a plant are disposed in the plant-growing vessel of FIG. 8, and water is supplied to the vessel.

When the layer 2 or 2a of the hydrogel-forming polymer is disposed on the base material 1 of the vessel or sheet, the embodiment of the arrangement is not particularly limited. In view of easiness in the arrangement thereof, there may preferably be used any of an embodiment wherein the polymer layer 2 is disposed directly on the base material 1 (FIG. 7A), an embodiment wherein the polymer layer 2 is disposed on a layer 7 of a sticking agent or adhesive which is disposed on the base material 1 (FIG. 7B), or an embodiment wherein the polymer layer 2 in the shape of an arbitrary form such as particulate-type and indeterminate-type is disposed on a layer 7 of a sticking agent or adhesive which is disposed on the base material 1 (FIG. 7C). In the above-mentioned embodiment of FIG. 7A, in order to impart an adhesive property to the polymer layer 2 with respect to the base material 1 or to enhance the adhesive property, it is possible that a hydrogel-forming polymer is mixed or dispersed in the sticking agent or adhesive, and then is formed into the above-mentioned polymer layer 2 as desired. In such a case, it is preferred to use the sticking agent or adhesive in an amount about 0.01–10 wt. parts (more preferably, about 0.1–2 wt. parts) with respect to 10 wt. parts of the hydrogel-forming polymer.

As the above "sticking agent or adhesive", a known sticking agent or adhesive may be used without particular limitation, but it is preferred to use a substance which is substantially non-toxic or has a low toxicity to a plant to be cultivated, as the above-mentioned substance. Specific examples of such a sticking agent or adhesive may include: rubber or latex-type (natural rubber-type, isoprene latex-type), acrylic resin-type (acrylic-type, cyano-acrylate-type), epoxy resin-type, urethane resin-type, protein-type (soybean protein-type, gluten-type), starch-type (starch-type, dextrin-type), and cellulose-type (CMC-type, nitro-cellulose-type).

In any of the above-mentioned embodiments of the vessel or sheet, in order to effectively exhibit the function of the hydrogel-forming polymer, when the area of internal surface of the vessel (or the area of one of the side surfaces of a sheet) is denoted by Sa, and the weight of the disposed hydrogel-forming polymer is denoted by Mp, the amount of the application of the polymer (Mp/Sa) may preferably be about 0.0001 g/cm$^2$ (0.1 mg/cm$^2$) or more, more preferably about 0.001 g/cm$^2$ (1mg/cm$^2$) to 0.2 g/cm$^2$ (particularly about 0.002 g/cm$^2$ (2 mg/cm$^2$) to 0.1 g/cm$^2$).

Process for Producing Plant-growing Vessel or Sheet

The process for producing a shaped product (vessel or sheet), the base material surface of which the hydrogel has been fixed is not particularly limited, but, e.g., either of the following two processes may preferably be used.

The first process is one wherein the material to be used as the base material is shaped into a vessel or sheet such as pot and planter in advance, then a substance (such as sticking agent and adhesive) having a function of fixing the hydrogel-forming polymer or hydrogel is applied onto a face for forming the internal surface of the shaped product, and the hydrogel-forming polymer or hydrogel is fixed onto the thus applied substance.

The second process is one wherein a substance (such as sticking agent and adhesive) having a function of fixing the hydrogel-forming polymer or hydrogel is applied onto a surface of a sheet or film to be formed into the base material, the hydrogel-forming polymer or hydrogel is fixed onto the thus applied substance, and then the resultant product is shaped into a form such as pot or planter by a pressure molding process, etc.

When the above-mentioned first process is used, the material to be formed into a base material may be shaped into a form such as pot or planter by various kinds of molding processes such as injection molding, pressure molding, and blow molding. As the above substance for fixing the hydrogel-forming polymer or hydrogel to the internal surface of the shaped product, a known substance such as sticking agent or adhesive which is ordinarily commercially available may be used without particular limitation, but it is preferred to use a substance which is substantially non-toxic or has a low toxicity to a plant, as the above-mentioned substance. Specific examples of such a sticking agent or adhesive may include: sticking agents and adhesives of rubber-type, latex-type, acrylic resin-type, epoxy resin-type, urethane resin-type, protein-type, starch-type, and cellulose-type.

It is possible that the above adhesive or sticking agent is applied onto the internal surface of the above-mentioned shaped product by spraying, casting, or dipping, etc., and the hydrogel-forming polymer or hydrogel is fixed onto the thus applied adhesive or sticking agent. Further, in place of the above-mentioned adhesive, sticking agent, etc., it is also possible that a double-side adhesive-coated tape onto which the above-mentioned sticking agent, etc., has been applied in advance, is attached to the internal surface of the above-mentioned shaped product, and the hydrogel-forming polymer or a hydrogel is fixed onto the tape.

In the above first process, it is also possible that the material to be formed into the base material is shaped into a form such as pot and planter by injection molding, etc., a material obtained by dispersing a hydrogel-forming polymer or hydrogel in a thermoplastic elastomer, etc., is applied to the internal surface of the resultant shaped product by injection molding using a two-color molding process, whereby the hydrogel-forming polymer or hydrogel may be fixed onto the internal surface of the shaped product of the base material.

On the another hand, in the second process, it is possible that a substance (such as above-mentioned adhesive and sticking agent) capable of fixing the hydrogel-forming polymer or hydrogel is applied onto the surface of sheet or film to be formed into the base material by spraying, casting, etc., or the above-mentioned double-side adhesive-coated tape is attached thereonto, and then the hydrogel-forming polymer or hydrogel is fixed onto the thus applied or attached substance, and the resultant base material is shaped by pressure molding, etc. Further, a material obtained by dispersing the hydrogel-forming polymer or hydrogel in a thermoplastic elastomer, etc., is shaped into a multi-layer sheet or multi-layer film by a multi-layer extrusion process together with a material to be formed into the base material so that the hydrogel-forming polymer or hydrogel is fixed onto the base material sheet or base material film, and then the resultant base material is shaped by pressure molding, etc.

Method of Using Plant-growing Vessel or Sheet

As the method of effectively transferring (or plant-embedding) a plant by using the vessel or sheet having the hydrogel-forming polymer disposed therein according to the present invention, e.g., the following methods of using the vessel or sheet may preferably be used.

(1) There is used a vessel or a sheet shaped into a vessel-type form which contains hydrogel-forming polymer particles disposed therein in an amount such that the inside of the vessel is filled with the resultant hydrogel when the polymer particles absorb water. Then, at least a portion of a plant is placed in the vessel or sheet, and thereafter a (fertilizer) solution, etc., is added into the vessel so as to swell the hydrogel-forming polymer particles, thereby to fix the plant.

(2) There is used a vessel or a sheet shaped into a vessel-type form which contains hydrogel-forming polymer particles disposed therein in an amount such that the inside of the vessel is filled with the resultant hydrogel when the polymer particles absorb water.

Then, a solution, etc., is added into the vessel or sheet so as to fill the vessel or sheet with the resultant hydrogel, and thereafter at least a portion of a plant is inserted into the gel, thereby to fix the plant.

When the above-mentioned method (1) or (2) is used, since the swollen hydrogel particles containing water have an appropriate fluidity, the plant may smoothly be transferred without damaging the plant. Further, in the case of a minute tissue such as seed, adventive embryo to be provided by tissue culture, and PLB (Protocorm Like Body; a tissue provided by tissue culture, which is similar to spherical tissue formed by the germination of a seed), it is also possible to use a method of simply placing the tissue, etc., on the hydrogel.

(3) There is used a vessel or a sheet shaped into a vessel-type form which contains hydrogel-forming polymer particles disposed therein in an amount such that the inside of the vessel is not sufficiently filled with the resultant hydrogel when the polymer particles absorb water. At least a portion of a plant is placed in the vessel together with a plant supporting support, and then a solution, etc., is added into the vessel so as to swell the hydrogel-forming polymer, thereby to fix the plant.

(4) A plant is wrapped in a sheet (sheet according to the present invention) which has been coated with particles of the hydrogel-forming polymer, and is planted or embedded into an usual vessel or support, and then a solution, etc., is added into the vessel so as to swell the hydrogel-forming polymer, thereby to fix the plant.

When any of the above-mentioned (1) to (4) is used, the plant may easily be attached or fixed to the support immediately.

Transferring Method

On the another hand, as the method of effectively transferring a plant (or taking out a plant) by using the vessel or sheet having the hydrogel-forming polymer disposed therein according to the present invention, e.g., the following methods of using the vessel or sheet may preferably be used.

(1) A method wherein a large excess of water is supplied to the vessel or sheet so as to enhance the fluidity of the hydrogel, thereby to take out the plant without damaging the plant.

(2) A method of using a vessel or sheet having the hydrogel-forming polymer comprising a polymer having a carboxyl group, wherein the hydrogel in a swollen state is shrunk by adding thereto a high concentration of calcium solution or calcium salt powder, thereby to take out the plant without damaging the plant.

(3) A method of using a vessel or sheet having the hydrogel-forming polymer having a property such that the water absorption magnification is decreased along with an increase in temperature in the temperature range of not lower than 0° C. and not higher than 70° C., and the change in the water absorption magnification is reversible with respect to temperature, wherein the vessel or sheet is warmed up to a temperature which does not adversely affect a plant so that the swollen hydrogel particles are caused to discharge the water content contained therein to be shrunk, whereby the plant is taken out without damaging the plant.

(4) A method of using a vessel or sheet having the hydrogel-forming polymer having a property such that the water absorption magnification is decreased along with an increase in temperature in the temperature range of not lower than 0° C. and not higher than 70° C., and the change in the water absorption magnification is reversible with respect to temperature, wherein the vessel or sheet is supplied with warm water which does not adversely affect a plant, so that the swollen hydrogel particles are caused to discharge the water content contained therein to be shrunk, and the fluidity of the gel particles is enhanced, whereby the plant is taken out without damaging the plant. The temperature of the above warm water may preferably be about 45° C. or less (more preferably about 40° C. or less), while the temperature may somewhat vary depending on the kind of the plant.

When any of the above-mentioned method (1) to (4) is used, the plant may easily be taken out from the vessel immediately without damaging the plant.

Method of Removing Liquid Substance Such as Water

In view of an improvement in workability, reduction in transporting costs, etc., at the time of the transportation (such as shipment), it is important to reduce the weight of the cultivating vessel. Further, at the time of the transportation, the plant is put under a closed-type environment (e.g., a state wherein the plant is packed with cellophane together with a vessel, and put in a corrugated board) in many cases. Under such a condition, in order to prevent the damage to the plant even in a wetted state, it is important to reduce the amount of water contained in the cultivating vessel to as small amount as possible.

In a case of using the vessel or sheet according to the present invention which has the hydrogel-forming polymer disposed therein, when the water content or liquid such as fertilizer solution in the vessel or sheet becomes unnecessary, for example, the liquid may preferably be removed by the following method.

(1) A method wherein the hydrogel particles are dried so that the hydrogel particles are caused to discharge water contained therein, and the weight thereof is reduced. However, it is necessary to conduct such a method in a certain range such that the resultant "concentration of nutrient" does not substantially affect the plant adversely.

(2) A method of using a vessel or sheet having the hydrogel-forming polymer comprising a polymer having a carboxyl group, wherein the hydrogel in a swollen state is shrunk by adding thereto a high concentration of calcium solution or calcium salt powder, thereby to cause the hydrogel to discharge a liquid such as water content and fertilizer solution.

(3) A method of using a vessel or sheet having the hydrogel-forming polymer having a property such that the water absorption magnification is decreased along with an increase in temperature in the temperature range of not lower than 0° C. and not higher than 70° C., and the change in the water absorption magnification is reversible with respect to temperature, wherein the vessel or sheet is warmed up to a temperature which does not adversely affect a plant so that the swollen hydrogel particles are caused to discharge a liquid such as water content and fertilizer solution which has been contained in the hydrogel particles.

In the prior art, the water which has been supplied to a plant before the shipment thereof may cause a problem such that it weaken the resistance to dryness so as to decrease the persistence of the flower, and it decrease the sugar content in the resultant fruit. Also in order to solve such a problem, it is preferred to remove water content, etc., by using the above-mentioned (1) to (3) (preferably, by the method (2) or (3)) in advance, before the shipment.

EXAMPLES

Hereinbelow, the present invention will be described in more detail with reference to Examples.

Example 1

Preparation of Water-Retaining Support 10 g (140 mmol) of acrylic acid and 0.05 g (0.32 mmol) of N,N'-methylenebis acrylamide were dissolved in 26 ml of distilled water. Into thus obtained solution, 0.52 g (7 mmol) of calcium hydroxide and 14 ml (14 mmol) of 1N-aqueous potassium hydroxide solution were added. While the resultant mixture was stirred at room temperature under a stream of nitrogen, 0.02 g of ammonium persulfate and 0.01 g of ascorbic acid were added thereto. After 5 minutes counted from the addition of the ammonium persulfate and ascorbic acid, the temperature of the reaction mixture was abruptly increased so that the mixture was converted into a gel. Further, the reaction was continued as it was for 1 hour under the stream of nitrogen.

200 ml of ethyl alcohol was added to the resultant product, and was pulverized in a mixer. The resultant gel was separated from the pulverized product and was subjected to vacuum drying.

A predetermined amount (0.2 g) of thus obtained hydrogel-forming polymer (water-retaining support according to the present invention) was weighed in a platinum crucible, was subjected to ashing in an electric furnace (at 700° C.), and was then dissolved in 5 ml of 1N-hydrochloric acid. Distilled water was added to the resultant product to provide a total volume of 50 ml. When the potassium ion content therein was determined by means of an atomic absorption spectrophotometer (mfd. by Seiko Electronics K. K.; trade name: SAS-760), it was found to be 1.3 mmol/g.

The calcium ion absorption (amount) of the above water-retaining support and its water absorption magnification in ion-exchange water (electric conductivity: 2.5 $\mu$S/cm) were 19 mg/g and 377 (times), respectively.

Example 2

Preparation of Water-Retaining Support 5 g of a commercially available sodium polyacrylate-type highly water-absorbing resin (trade name: Acryhope; mfd. by Nippon Shokubai K. K.) was swollen with 1 L of ion-exchange water. To the thus swollen highly water-absorbing resin, an aqueous solution which had been obtained by dissolving 2.9 g of calcium chloride (dihydrate salt) in 500 ml of ion-exchange water was added. As the resultant mixture was left standing for 1 hour at room temperature (25° C.) while being occasionally stirred, the sodium salt of carboxyl group was partially substituted by the calcium salt.

The resultant supernatant above the swollen resin was discarded, 2 L of ion-exchange water was added to the resultant gel so as to wash the gel, and then the supernatant above the swollen resin was discarded again. After the operation of washing the gel with ion-exchange water was repeated five times, 1 L of ethyl alcohol was added to the gel to shrink the gel, and the gel was separated from the resultant mixture and was subjected to vacuum drying.

A predetermined amount of thus obtained water-retaining support was weighed in a platinum crucible and was subjected to ashing in an electric furnace, dissolved in hydrochloric acid, and total volume thereof was adjusted to the fixed value, and the sodium ion content therein was determined by atomic absorption spectrometry, in the same manner as in Example 1. As a result, the sodium ion content was found to be 2.2 mmol/g. Further, the calcium ion content was 2.1 mmol/g.

The calcium ion absorption of the above water-retaining support and its water absorption magnification in ion-exchange water (electric conductivity: 2.5 US/cm) were 36 mg/g and 175 (times), respectively.

Example 3

Preparation of Water-Retaining Support 20 g of a commercially available sodium polyacrylate highly water-absorbing resin (trade name: Acryhope; mfd. by Nippon Shokubai K. K.) was swollen with 1 L of ion-exchange water. To the thus swollen resin, 170 ml of 1N-hydrochloric acid was added. While the mixture was occasionally stirred at room temperature (25° C.), the sodium salt of carboxyl group was substituted by carboxylic acid for 1 hour.

The resultant supernatant above the swollen resin was discarded, 2 L of ion-exchange water was added to the resultant gel so as to wash the gel, and then the supernatant above the swollen resin was discarded again. Further, 1 L of ion-exchange water and 20 ml of IN-hydrochloric acid were added to the resultant gel. After the thus obtained mixture was left standing for 1 hour at room temperature (25° C.) while the mixture was occasionally stirred, the gel was separated therefrom and was subjected to vacuum drying.

A predetermined amount of the thus obtained polyacrylic acid crosslinked product was weighed in a platinum crucible and, in the same manner as in Example 1, was subjected to ashing in an electric furnace, dissolved in hydrochloric acid, and the total volume thereof was adjusted to the fixed value, and the alkali metal ion content therein was determined by atomic absorption spectrometry. As a result, the alkali metal ion content was found to be 0.01 mmol/g or less, and the water absorption magnification of the polymer in ion-exchange water (electric conductivity: 2.5 $\mu$S/cm) was 14 (times).

2 g of the above-mentioned polyacrylic acid crosslinked product was swollen with 500 ml of ion-exchange water. 2.78 ml of 1N-aqueous potassium hydroxide solution was added to the thus swollen product, and while the mixture was occasionally stirred at room temperature (25° C.), and its carboxylic acid was partially substituted by potassium salt for 1 hour. The resultant supernatant was discarded, and the gel was separated from the mixture and was subjected to vacuum drying. A predetermined amount of the resultant water-retaining support according to the present invention was weighed in a platinum crucible, subjected to ashing in an electric furnace, dissolved in hydrochloric acid, and the total volume thereof was adjusted to the fixed value, and the potassium ion content therein was determined by atomic absorption spectrometry. As a result, the potassium ion content was found to be 1.3 mmol/g.

The calcium ion absorption of the above water-retaining support and its water absorption magnification in ion-exchange water (electric conductivity: 2.5 $\mu$S/cm) were 21 mg/g and 171 (times), respectively.

Example 4

Preparation of Water-Retaining Support

A water-retaining support according to the present invention was obtained in the same manner as in Example 3 except that the amount of the 1N-aqueous potassium hydroxide solution to be used for the potassium salt substitution was changed to 5.56 ml.

A predetermined amount of the thus obtained water-retaining support was weighed in a platinum crucible and, in the same manner as in Example 1, was subjected to ashing in an electric furnace, dissolved in hydrochloric acid, and the total volume thereof was adjusted to the fixed value, and the potassium ion content therein was determined by atomic absorption spectrometry. As a result, the potassium ion content was found to be 2.5 mmol/g.

The calcium ion absorption of the above water-retaining support and its water absorption magnification in ion-exchange water (electric conductivity: 2.5 $\mu$S/cm) were 40 mg/g and 185 (times), respectively.

Example 5

Preparation of Thermo-sensitive Water-retaining Support 15 g of N-isopropyl acrylamide (NIPAAm, mfd. by Kojin K. K.), 0.47 g of acrylic acid, 0.1 g of N,N'-methylenebis-acrylamide (Bis), 0.2 g of ammonium persulfate, 6.6 mL of 1N-NaOH, and 0.1 mL of N,N,N'-N'-tetramethylethylene diamine was dissolved in 90 mL of distilled water. The resultant mixture was subjected to polymerization for 4 hours at room temperature, thereby to obtain a poly-N-isopropyl acrylamide (PNIPAAm) hydrogel having a crosslinked structure.

The resultant gel was mechanically crushed by means of a mixer, and the resultant product was dispersed in one liter of distilled water and cooled to 4° C. Thereafter, the resultant mixture was warmed to 50° C. so as to be shrunk, and the resultant supernatant liquid was discarded. Such a washing operation was repeated twice, thereby to remove the unreacted monomer and the remaining polymerization initiator. Further, the product was dried under vacuum (100° C., 24 hours), thereby to obtain a water-retaining support according to the present invention. In the thus obtained support, the water absorption magnification was decreased along with an increase in temperature, and the change in the water absorption magnification was reversible with respect to temperature.

The calcium ion absorption of the above water-retaining support and its water absorption magnification in ion-exchange water (electric conductivity: 2.5 $\mu$S/cm) were 9 mg/g and 167 (times), respectively.

The water absorption magnification of the thus obtained water-retaining support with respect to a commercially available powder horticultural fertilizer (trade name: Hyponex 20-20-20, mfd. by Hyponex Japan K. K.; 1 g/L) was measured at 19° C. and 26° C. according to the method as described hereinabove. The thus measured water absorption magnification was about 72 at 19° C., and about 52 at 26° C.

Comparative Example 1

Comparative Example for Example 3

A water-retaining support of Comparative Example was obtained in the same manner as in Example 3 except that the amount of the 1N-aqueous potassium hydroxide solution was changed to 0.35 ml. A predetermined amount of the thus obtained water-retaining support was weighed in a platinum crucible, and in the same manner as in Example 1, was subjected to ashing in an electric furnace, dissolved in hydrochloric acid, and the total volume thereof was adjusted to the fixed value, and the potassium ion content therein was determined by atomic absorption spectrometry. As a result, the potassium ion content was found to be 0.15 mmol/g.

The calcium ion absorption of the above water-retaining support and its water absorption magnification in ion-exchange water (electric conductivity: 2.5 $\mu$S/cm) were 2 mg/g and 75, respectively.

Comparative Example 2

Comparative Example for Example 3

A water-retaining support of Comparative Example was obtained in the same manner as in Example 3 except that the amount of the 1N-aqueous potassium hydroxide solution was changed to 8.34 ml. A predetermined amount of the thus obtained water-retaining support was weighed in a platinum crucible, and in the same manner as in Example 1, was subjected to ashing in an electric furnace, dissolved in hydrochloric acid, and the total volume thereof was adjusted to the fixed value, and the potassium ion content therein was determined by atomic absorption spectrometry. As a result, the potassium ion content was found to be to be 3.6 mmol/g.

The calcium ion absorption of the above water-retaining support and its water absorption magnification in ion-exchange water (electric conductivity: 2.5 $\mu$S/cm) were 55 mg/g and 191, respectively.

Comparative Example 3

Examples of Commercially Available Resins

With respect to three kinds of commercially available highly water-absorbing resins (trade name: Acryhope, mfd. by Nippon Shokubai K. K.; trade name: Diawet, mfd. by Mitsubishi Chemical K. K.; and trade name: Sumicagel, mfd. by Sumitomo Chemical K. K.), the calcium ion absorption and the water absorption magnification in ion-exchange water (electric conductivity: 2.5 $\mu$S/cm) were measured. The thus obtained results are shown in the following Table 1 together with the results obtained in Examples 1 to 5 and Comparative Examples 1 and 2.

Example 6

Test of Seed Germination

Synthetic water (as shown in Table 2 appearing herein below) having a composition similar to that of underground water in Kumano district of Enzan City in Yamanashi Prefecture was prepared. Into a test tube (having a diameter of 2.5 cm and a height of 15 cm), 16 ml of the above synthetic water and 160 mg (1 wt. %) of each of the water-retaining supports of the present invention prepared in Examples 1, 2, 3, and 4 was introduced. After the resultant mixture was sufficiently stirred, the mixture was left standing for 30 minutes at 25° C., thereby to prepare a gel-like culture medium comprising the water-retaining support which had absorbed the synthetic water.

Seeds of white radish sprouts (Takii Shubyo K. K.) were uniformly put on each of the surfaces of the thus obtained gel culture medium in the test tubes in an mount of 5 seeds/test tube, and the test tube was capped with a silicone plug having a 6-mm diameter hole filled with cotton.

The thus capped test tube was cultured for 4 days in a culture chamber (25° C., illumination intensity of 2000 lux, 16h-daytime (fluorescent light illumination)), and the ratio of germination (number of germinated seeds/5 (seeds)×100 (%)) was investigated.

In the above-mentioned germination and germination activity test, the case wherein the seed coat was torn and the cotyledon was unfolded was defined as the occurrence of germination, and the other cases are defined as no occurrence of germination. The length of the shoot portion was measured as the average stem length from the base portion to the leaf tip of the germinated seed, while the length of the root portion was measured as the average root length from the base portion to the tip of the main root of the germinated seed. Further, the appearance of the root tip, etc., was observed.

The thus obtained results are inclusively shown in Table 3. In the water-retaining support according to the present invention prepared in Examples 1, 2, 3, and 4, germination was 100% in all the groups, and the growth of white radish was very good in both shoots and roots.

Comparative Example 4

Comparative Example for Example 6

The germination tests were conducted in the same manner as in Example 6 with respect to the two kinds of water-retaining supports prepared in Comparative Examples 1 and 2, and three kinds of commercially available highly water-absorbing resins (Acryhope, Diawet, and Sumicagel) used in Comparative Example 3.

In the case wherein the water-retaining support of Comparative Example 1 was used, the water absorption magnification was so insufficient that the culture medium was in the form of a liquid, whereby the seeds were sunk in the culture medium and showed no germination thereof. In the cases where the water-retaining supports of Comparative Example 2 and the commercially available highly water-absorbing resins were used, the seeds showed 100% germination, but the tip of the root caused browning and fatal withering after the root origination thereof, and the growth of the shoot portion was completely suppressed (as shown in the following Table 3).

TABLE 1

Calcium Absorption and Water absorption Magnification of Water-Retaining Support

| Sample | Calcium ion absorption (mg/g) | Water absorption magnification |
|---|---|---|
| Example 1 | 19 | 377 |
| Example 2 | 36 | 175 |
| Example 3 | 21 | 171 |
| Example 4 | 40 | 185 |
| Example 5 | 9 | 167 |
| Comp.Ex.1 | 2 | 75 |
| Comp.Ex.2 | 55 | 191 |
| Acryhope | 150 | 196 |
| Diawet | 140 | 172 |
| Sumicagel | 100 | 326 |

TABLE 2

Composition of Synthetic Water

| Component | Concentration(mg/L) |
|---|---|
| $Ca(NO_3)_2 \cdot 4H_2O$ | 272 |
| $MgSO_4 \cdot 7H_2O$ | 111 |

TABLE 2-continued

Composition of Synthetic Water

| Component | Concentration(mg/L) |
|---|---|
| KCl | 22 |
| $NaHCO_3$ | 126 |

(Respective components were dissolved in ion-exchange water at its predetermined concentration, and then pH of the resultant mixture were adjusted to 7 by using hydrochloric acid.)

TABLE 3

Results of Germination Rate and Growth Test for White Radish

| Sample | Germination rate (%) | Shoot length (cm) | Root length (cm) | Comments on appearance |
|---|---|---|---|---|
| Example 1 | 100 | 6.5 | 4.2 | Good |
| Example 2 | 100 | 4.5 | 2.5 | Good |
| Example 3 | 100 | 5.5 | 3.1 | Good |
| Example 4 | 100 | 5.5 | 3.1 | Good |
| Example 5 | 100 | 7.0 | 4.3 | Good |
| Comp.Ex.1 | 0 | 0 | 0 | Seeds sunk |
| Comp.Ex.2 | 100 | 2.0 | 0 | Root tip caused |
| Acryhope | 100 | 1.0 | 0 | browning and |
| Diawet | 100 | 1.0 | 0 | fatal withering |
| Sumicagel | 100 | 1.0 | 0 | |

Example 7

Surface-Crosslinked Water-Retaining Support

Into a mixer, 100 g of a hydrogel-forming polymer (in a powder form) obtained in the same manner as in Example 1 were introduced. While the polymer was being stirred, 4 g of an aqueous crosslinking agent solution which had been obtained by dissolving 10 wt. % of ethylene glycol diglycidyl ether in 15 wt. % of aqueous sodium propinate solution was added to the polymer and was sufficiently mixed therewith. The resultant mixture was heat-treated at 150° C. for about 20 minutes, thereby to obtain a surface-crosslinked water-retaining support for plant according to the present invention.

The potassium ion content of the thus obtained water-retaining support was measured in the same manner as in Example 1, and the potassium ion content was found to be 1.2 mmol/g.

The calcium ion absorption of the above water-retaining support and its water absorption magnification in ion-exchange water (electric conductivity: 2.5 $\mu$S/cm) was 16 mg/g and 314 (times), respectively.

3 g of the above water-retaining support was introduced into a plant box (mfd. by Shibata Hario K. K., comprising polycarbonate, upper portion=75×75 mm, lower portion= 65×65 mm, height=100 mm). When the support was caused to absorb 150 ml of a Hyponex solution (Hyponex 7-6-9 (mfd. by Hyponex Japan K. K.); 1 g/L), the solution was rapidly absorbed thereinto, and the support was entirely solidified in a state wherein appropriate voids were retained among the swollen water-retaining support particles. To the above gel culture medium, orchid (cymbidium) plantlets of MFMM (Cym. MELODY FAIR 'Marilyn Monroe') were transplanted. After the plantlets were cultivated for 60 days in a greenhouse, it was observed that all of the flower, stem, and root portions of the orchids were well grown.

Example 8 pH Measurement of Water-Retaining Support

Into 100 ml of ion-exchange water, 1 g of each kind of synthetic polymers in a dry state as shown in the following Table 4 was dispersed. After 1 hour counted from the mixing, the pH value of the resultant mixture was measured by use of a pH meter (mfd. by Yokogawa Electric K. K.; trade name: PH-81). It was confirmed that the water-retaining supports of the present invention obtained in Examples 1 to 5 were weakly acidic (pH 4.7 to 6.0) which were suitable for plant growth.

TABLE 4

| Sample | pH |
| --- | --- |
| Example 1 | 4.8 |
| Example 2 | 6.0 |
| Example 3 | 4.7 |
| Example 4 | 5.0 |
| Example 5 | 5.4 |
| Comp.Ex.1 | 3.7 |
| Comp.Ex.2 | 5.5 |
| Acryhope | 7.0 |
| Diawet | 7.0 |
| Sumicagel | 7.9 |

Example 9

Culture Method Using Water-Retaining Support

In a test tube (having a diameter of 2.5 cm and a height of 15 cm), 16 ml of a culture liquid (containing 20 g/L of sucrose and 100 g/L of banana) including a commercially available powder type horticultural fertilizer (trade name: Hyponex 7-6-19, mfd. by Hyponex Japan K. K., 3.5 g/L) was mixed with and dispersed into 400 mg of the dried water-retaining support prepared in Example 3. After the mixture was sterilized by an autoclave (121° C., 1.2 kg/cm$^2$, 20 minutes), the mixture was left standing at room temperature, thereby to prepare a hydrogel culture medium.

Into the above-mentioned culture medium in each of test tubes, two orchid plantlets of YT57 (Cym. LOVELY ANGEL 'The Two Virgins') which had been grown so as to have a length of about 1.5 cm were transplanted; and the plantlets were aseptically cultured for 50 days in a culture chamber (25° C., 3000 Lux, 16h-daytime). The maximum leaf length of each plantlet was measured, it was found to be 6.7 cm on average. The roots of plantlets were well elongated. The plantlets were also grown well after they were moved into cultivation under greenhouse condition, and exhibited substantially no dying of the leaf tip.

Comparative Example 5

Culture Method Using Agar

YT57 plantlets were cultured for 50 days in the same manner as in the above-mentioned Example 9 except that 100 mg of agar was added instead of the dried water-retaining support used in Example 9. The maximum leaf length of each plantlet was measured and it was found to be 6.7 cm on average, which was substantially the same as that in the above-mentioned Example. Their roots were well grown in the appearance thereof, but somewhat dying of the leaf tip was observed after they were moved into cultivation under greenhouse condition. It was presumed that the above phenomenon was attributable to the fact that the plantlets during the culture were not appropriately acclimated to water stress.

Comparative Example 6

Culture Method Using Commercially Available Resin

YT57 plantlets were cultured for 50 days in the same manner as in the above-mentioned Example 9 except that 400 mg of Acryhope was added therein instead of the dried water-retaining support used in Example 9. No growth was observed in any of the shoot and root portions thereof.

Example 10

Culture Method Using Water-Retaining Support

In a plant box (mfd. by Shibata Hario K. K., comprising polycarbonate, upper portion=75×75 mm, lower portion=65×65 mm, height=100 mm), 1.5 g of the dried water-retaining support obtained in Example 5 and 105 ml of a Hyponex solution (Hyponex 7-6-9; 2.0 g/L) was mixed and dispersed together. After the mixture was sterilized by an autoclave (121° C., 1.2 kg/cm$^2$, 20 minutes), the mixture was aseptically mixed with 80 ml of pearlite (mfd. by Nihon Cement K. K.; trade name: Asano-Pearlite No. 3) which had been separately sterilized, thereby to prepare a hydrogel culture medium.

To the above culture medium, orchid plantlets of MFMM (Cym. MELODY FAIR 'Marilyn Monroe') which had been grown so as to have a length of about 4 cm were transplanted in an amount of 16 plants in each box; and the plantlets were aseptically cultured for 50 days in a culture chamber (25° C., 3000 Lux, 16h-daytime). The plantlets were well grown, the state of their root was very good, and white thick roots, which were similar to those obtained in the growth in farm cultivation, were elongated.

Comparative Example 7

Culture Method Using Agar

MFMM plantlets were cultured for 50 days in the same manner as in the above-mentioned Example 10 except that agar gel (700 mg) was used alone instead of the dried water-retaining support used in Example 10. The shoot portions were well grown, but the roots were not elongated so much and the roots were thin which had a form different from those to be elongated in farm cultivation.

Comparative Example 8

Culture Method Using Commercially Available Resin

YT57 plantlets were cultured for 50 days in the same manner as in the above-mentioned Example 10 except that 1.5 g of Acryhope was added instead of the dried water-retaining support used in Example 10. No growth was observed in any of the shoot and root portions.

Example 11

Acclimation During Culture by Water-Retaining Support

Into 20 g of the dried water-retaining support prepared in Example 1, each of amounts of 1000, 800, 600, 400, and 200 cc of a Hyponex solution (Hyponex 7-6-19, 2 g/L, dissolved in synthetic water) was completely absorbed so as to form a gel. The pF values of the thus obtained gels were measured by a pF meter (manufacture by Daiki Rika Kogyo K. K.;

DIK-8340) to be 0, 0, 1.8, 2.1, and 2.3, respectively. The water content in a culture medium immediately after plantlet transplantation in usual culture is decreased by 40 to 80% until the culture-terminating stage due to the evaporation toward the outside of the vessel and the absorption thereof by a plant during the culture. In this Example, however, it was found that the pF at termination of the culture changed to the range of 1.8 to 2.3 when the hydrogel-forming polymer was used in this Example. That is, it is presumed that, in the plantlet culture using the water-retaining support according to the present invention, an appropriate water stress is applied to the root of a plant during the culture, thereby to well acclimate the plant.

Comparative Example 9

Water Stress Deficiency in Agar Culture Method

With 1000 cc of the Hyponex solution used in Example 10, 7 g of agar was heated and dissolved. After the mixture was converted into a gel at room temperature, the pF value thereof was measured and it was found to be 0 (zero). After the gel was dried in a culture chamber, and the pF value at each of the gel weights of 809 g, 609 g, 409 g, and 209 g was measured. As a result, all of them were found to be 0. Though 40 to 80% of water in a culture medium is usually decreased during culture, it was found that the pF value in the agar gel hardly changed. That is, it is presumed that, in the plantlet culture using the agar gel, no stress is applied to the root of a plant during the culture at all, whereby preferable acclimation would not proceed.

TABLE 5

Shifting of pF Value upon Decrease in Water during Culture

| Water amount | 1000 | 800 | 600 | 400 | 200 |
| --- | --- | --- | --- | --- | --- |
| Example 11 | 0 | 0 | 1.8 | 2.1 | 2.3 |
| Comparative Example(Agar) | 0 | 0 | 0 | 0 | 0 |

Example 12

Example of Liquid Culture

Into an Erlenmeyer flask (mfd. by Shibata Hario Glass K. K.; volume: 500 ml), 200 ml of 1/2 Murashige & Skoog culture medium (containing 20 g/L of sucrose) was introduced. Then, the dried water-retaining support prepared in Example 5 was added to the medium at various concentrations (no addition, 0.4 g and 1.0 g), and mixed and dispersed therein. After the mixture was sterilized by an autoclave (121° C., 1.2 kg/cm$^2$, 20 minutes), the mixture was left standing at room temperature, thereby to prepare a suspension culture medium. The volume ratio of the suspension culture medium to the gel was about 9:1 in the 0.4 g-addition group, and about 3:1 in the 1.0 g-addition group.

Into the above-mentioned culture medium, PLB (Protocorm Like Body; systematic cell agglomeration peculiar to an orchid) was transplanted in an amount of 2.0 g in each flask, and aseptically cultured for 22 days in a culture chamber (25° C., 3000 Lux, 16h-daytime) while the culture medium was shaken and horizontally rotated (80 revolutions per 1 minute with a radius of gyration of 27 mm). Thereafter, the resultant fresh weight of the PLB was measured, and the state of the PLB and the state of elution of a browning material into the culture liquid were observed.

As shown in Table 6, it was found that the addition of the water-retaining support according to the present invention to the suspension culture system accelerated the propagation of PLB and suppressed the elution of the browning materials.

TABLE 6

Effect of Addition of Water-Retaining support to Liquid Culture Medium on PLB Propagation in MFMM

| Water-retaining carrier concentration (%) | Multiplication rate (times) | Form of PLB | State of browning elution |
| --- | --- | --- | --- |
| 0 | 3.2 | Small grain | Elution was noticeable |
| 0.2 | 5.8 | Large grain | Elution was medium |
| 0.5 | 5.9 | Large grain | Elution was little |

Example 13

Cultivating Method Using Water-Retaining Support

Into 115 ml of the synthetic water shown in Table 2, 100 mg of Hyponex powder (Hyponex 20-20-20, mfd. by Hyponex Japan K. K.) was dissolved. The resultant solution was completely absorbed in 1 g of each of various kinds of hydrogel-forming polymer powder, so as to form a gel. Into each of the above gels, 50 cc of pearlite was added and uniformly mixed therewith. Each cell of a cell tray (mfd. by Tokan Kosan K. K.; single cell dimension: 2.5 cm(length)× 2.5 cm (width)×4.5 cm (height); cell number 10×20=200 holes; with a closed lower portion and an open upper portion) was filled with the thus obtained support. Each of plantlets of one genus of orchid plant family, Phalaenopsis (Dtps. Happy Valentine×Show Girl 'Mai'), and cymbidium YT57 was insert-transplanted one by one into each cell. The insertion could be performed very easily, and the root could fit well with the support without being damaged. The plants were cultivated for 45 days in a culture chamber (25° C., 3500 Lux, 16h-daytime), and the leaf length, root length, fresh weight, and number of roots of each plant were measured. During the cultivation, ion-exchange water was supplied with a syringe until the entire volume of the cell was filled therewith.

As a result, the plants were well grown when the hydrogel-forming polymers of Examples 1, 2, and 3 were used. The roots of plants were decayed during the cultivation when Acryhope, Diawet, and Sumicagel were used. It is presumed that the plant suffered a calcium deficiency state when any of Acryhope, Diawet, and Sumicagel was used.

As a control group, cultivation experiments were conducted in the same manner as that described above except that each of agar (10 g/L), bark (sold by Mukoyama Orchid Ltd.; bark produced in New Zealand; trade name: MO-2), and sphagnum was used as a support instead of the support comprising the hydrogel-forming polymer and pearlite.

As a result, in the case of the agar, insert-transplantation was easy but the root was decayed during the cultivation. In the case of the bark and sphagnum, the insert-transplantation was impossible, and each of these support was disposed around the root of the plant and then was transplanted into the above cells, but such an operation somewhat damaged the root. Further, in this case, the root was decayed in the course of the cultivation. It is presumed that such a phenomenon is attributable to the fact that the agar, bark, and sphagnum have weak water-absorbing force, and the surrounding of the root was filled with water, whereby the root suffers deficiency in oxygen.

The thus obtained results are summarized in the following Table 7.

TABLE 7

Growth Evaluation Test of Dtps. (Happy Valentine × Show Girl) 'Mai'

| Support | Average leaf length (cm) | Average root length (cm) | Fresh weight (g/one plant) | Average root number (number of roots) |
|---|---|---|---|---|
| Example 1 + Pearlite | 3.37 | 4.67 | 0.78 | 2.7 |
| Example 2 + Pearlite | 2.50 | 3.75 | 0.58 | 3.0 |
| Example 3 + Pearlite | 2.97 | 3.07 | 0.61 | 3.0 |
| Example 4 + Pearlite | 3.07 | 4.00 | 0.70 | 3.0 |
| Acryhope + Pearlite | Measurement was impossible since the root died | | | |
| Diawet + Pearlite | | | | |
| Sumicagel + Pearlite | | | | |
| Agar | | | | |
| Bark | | | | |
| Peat-moss | | | | |

Example 14

Cultivating Method Using Thermo-sensitive Water-Retaining Support

Into 95 ml of the synthetic water shown in Table 2, 95 mg of Hyponex powder (Hyponex 20-20-20; mfd. by Hyponex Japan K. K.) was dissolved. Into the resultant solution, 1 g of the water-retaining support powder prepared in Example 5 and 100 cc of pearlite was added and uniformly mixed. With the thus obtained support, each cell of the cell tray used in Example 13 was filled. One plantlet (fresh weight: 1.39 g) of one genus of orchid plant family, phalaenopsis (Phal. Musashino 'MH'×Phal. White Moon 'M-23'), was insert-transplanted in each cell. The insertion could be performed quite easily, and the root could fit well with the support without being damaged. After the plantlets were cultivated for 70 days in a greenhouse, the leaf length, root length, and the total fresh weight of each plant was measured. Watering during the cultivation was conducted almost everyday from the upper face automatic watering, or 30 minutes of capillary watering.

As a control group, a combination of bark (MO-2): sphagnum (Elein Polo Co., Ltd.; produced in Finland) :pearlite=6:3:1 (volume ratio) was used. Since the insert-transplantation using this support was impossible, the above support was disposed around the root of the plant and then was transplanted into cells, which somewhat damaged the root at the transplanting.

As shown in the following Table 8, in each watering method, better growth of plant was observed in the cultivation using the water-retaining support according to the present invention as the support, as compared with that in the case of the cultivation using the conventional supports.

TABLE 8

Growth Evaluation Test of Phal. Musashino 'MH' × Phal. White Moon 'M-23'

| Support | Shoot weight (g) | Root weight (g) | Fresh weight (g) |
|---|---|---|---|
| Watering method: upper face automatic watering | | | |
| Example 5 | 2.09 | 1.31 | 3.40 |
| Bark + peat + pearlite | 1.82 | 1.11 | 2.93 |
| Watering method: capillary watering | | | |
| Example 5 | 2.43 | 2.05 | 4.48 |
| Bark + peat + pearlite | 2.24 | 1.40 | 3.64 |

Example 15
(Cultivating Method Using Water-Retaining support

Into 1 g of the dried polymer powder prepared in Example 1, 100 ml of a Hyponex solution (Hyponex 20-20-20, 1 g/L, dissolved in synthetic water) was completely absorbed so as to form a gel. The pF value of the thus obtained gel was measured by a pF meter (manufacture by Daiki Rika Kogyo K. K., DIK-8340), and the value was found to be 0 (zero). The gel was transferred to a 9-cm diameter black plastic pot (available from Saegusa Shigeo Shoten; diameter: 7.5 cm), and the total weight was measured. With no watering at all, the plastic pot was left standing in a greenhouse, and the total weight and pF value thereof was measured three times at 24, 48, and 72 hours thereafter.

In this measurement, the following formulas were used.

Water content at each point=weight at each point−1 g (weight of dried polymer)−weight of black vinyl pot Initial value (value at starting) to be 1 (one),
Nutrient concentration of the solution at each point was determined as:

nutrient concentration at each point=initial water content/water content at each point.

Comparative Example 10

Cultivating Method Using Bark

The weight and moisture content of 100 ml of bark was measured and it was found to be 30.93 g and 35.7%, respectively. 100 ml of undried bark was soaked in the Hyponex solution used in Example 15 for 24 hours. The thus moisturized bark was scooped up with a net, and the surplus water was removed. The weight and pF value of the water-retaining bark was 46.56 g and 0, respectively. After the bark was transferred to the black plastic pot, the total weight thereof was measured, the bark was left standing in a greenhouse, and the total weight and pF value thereof was measured three times at 24, 48, and 72 hours after the initial measurement. The water content and concentration at each point was determined by using the formulas in the same manner as those in Example 15.

initial water content=30.93 (weight of 100 ml of bark)×0.357 (moisture content)+46.56 (water-retaining bark weight)−30.93 (weight of 100 ml of bark)=26.67 water content at each point=initial water content−(initial-total weight of vessel−weight at each point)

initial concentration of Example 15 to be 1,
initial concentration of the solution was determined as:

initial concentration of solution=26.67÷(30.93×0.357+26.67)=0.71 nutrient concentration of solution at each point=initial water content/water content at each point When the nutrient content in Example 15 was considered to be 1, the nutrient content of Comparative Example=26.6× 0.71÷100=0.19.

As shown in the following Table 9, when the water-retaining support according to the present invention is used as a cultivating support, since its moisture ratio is high, as compared with that in the case of the bark, the nutrient content may be made greater in the vessel having the same volume, and the fluctuation in the nutrient concentration during the culture may be made.smaller. Further, since a large amount of water may be retained for a long period, the frequency of watering may be reduced, and the risk of plant being exposed to water stress may be avoided.

TABLE 9

Changes in pF, Water Content, Nutrient Concentration, and Nutrient Content with Elapse of Time

| | Example 1 + water | | | | Bark + water | | | |
|---|---|---|---|---|---|---|---|---|
| Elapsed time (hs) | pF | Water content (cc) | Nutrient concent-ration | Nutrient content | pF | Water content (cc) | Nutrient concent-ration | Nutrient content |
| Initial | 0 | 100 | 1.00 | 1.00 | 0 | 27 | 0.71 | 0.19 |
| 24 | 0 | 78 | 1.28 | 1.00 | 0 | 17 | 1.11 | 0.19 |
| 48 | 0 | 67 | 1.50 | 1.00 | 0.5 | 10 | 1.90 | 0.19 |
| 72 | 0 | 56 | 1.80 | 1.00 | 2.0 | 5 | 3.80 | 0.19 |

As shown in the above Table 9, the following results were obtained.

The initial water content retained in Comparative Example was 27% on the basis of that of Example.

The initial nutrient content retained in Comparative Example was 19% on the basis of that of Example.

The nutrient concentration at the elapsed time of 72 hours was 1.8 times the initial concentration in Example, and the nutrient concentration at the elapsed time of 72 hours was 3.8 times the initial concentration in Comparative Example.

The residual water content at the elapsed time of 72 hours was 56 cc in Example and 5 cc in Comparative Example.

The pF value at the elapsed time of 72 hours was 0 in Example and 2.0 in Comparative Example.

Industrial Applicability

As described hereinabove, according to the present invention, there is provided a water-retaining support for plant comprising a hydrogel-forming polymer having a calcium ion absorption of less than 50 mg per 1 g of the dry weight thereof and having a water absorption magnification in ion-exchange water (at room temperature; 25° C.) of 100 or more.

The present invention also provides a water-retaining support for plant comprising a hydrogel-forming polymer having a carboxyl group bonded to the polymer chain thereof, and having a content of alkali metal salt or ammonium salt of the carboxyl group of 0.3 to 2.5 mmol per 1 g of the dry weight of the support.

When the water-retaining support for plant according to the present invention is used, since the water-retaining support absorbs therein only a small amount of calcium ion, a plant does not suffer from calcium ion deficiency. In addition, since the water absorption magnification of such a support is sufficiently large, the support can supply sufficient water to a plant.

The present invention further provides a plant-growing vessel comprising a vessel-shaped substrate capable of accommodating therein at least a portion of a plant; and a water-retaining support for plant disposed in the vessel-shaped substrate and having a crosslinked structure.

The present invention further provides a plant-growing sheet comprising a sheet-shaped substrate; and a water-retaining support for plant disposed on at least one surface of the substrate and having a crosslinked structure.

When the plant-growing vessel or sheet according to the present invention is used, on the basis of the characteristic (capacity to store water or nutrient, or the temperature dependency thereof) of the hydrogel-forming polymer which is disposed on the plant side of the vessel or sheet, and has a crosslinked structure, the volume of plant-growing vessel may be reduced markedly, thereby to improve the root origination ratio, to reduce the area required for plant growth, to reduce the amount of material required for a plant-growing vessel, and to decrease the transporting cost. Further, the cost may greatly be reduced by the labor-saving in water control, etc.

What is claimed is:

1. A water-retaining support for a plant comprising a hydrogel-forming polymer having a calcium ion absorption of less than 50 mg per g of dry weight thereof and having a water absorption magnification in ion-exchange water at room temperature, represented by the formula $(W_2-W_1)/W_1$, of 100 or more, wherein $W_1$ is the weight of the dry hydrogel-forming polymer and $W_2$ is the weight of the hydrogel-forming polymer after immersion in excess of ion-exchange water at room temperature for 48 hours.

2. The water-retaining support for a plant according to claim 1, wherein the hydrogel-forming polymer is a polymer having a carboxyl group bonded to the polymer chain thereof, and the content of alkali metal salt or ammonium salt of the carboxyl group is 0.3 to 2.5 mmol per g of dry weight of the support.

3. The water-retaining support for a plant according to claim 1, wherein the hydrogel-forming polymer is a polymer such that the total amount of organic material remaining in a liquid which has been obtained by extracting the polymer with distilled water in an amount 1,000 times that of the polymer is 15 ppm or less, in terms of the value of chemical oxygen demand.

4. The water-retaining support for a plant according to claim 1, wherein the hydrogel-forming polymer is a polymer such that the total amount of volatile carboxylic acid and salt thereof remaining in 1 g of dry weight of the polymer is 0.5 mmol or less.

5. The water-retaining support for a plant according to claim 1, wherein the hydrogel-forming polymer is a polymer containing at least 3 mmol of a carboxyl group bonded to the polymer chain thereof per g of dry weight, and the content of alkali metal salt or ammonium salt of the carboxyl group is 0.3 to 2.5 mmol per g of dry weight of the support.

6. The water-retaining support for a plant according to claim 5, wherein the hydrogel-forming polymer is a polyacrylic acid-type polymer.

7. The water-retaining support for a plant according to claim 5, which further contains a calcium salt of a carboxyl group.

8. The water-retaining support for a plant according to claim 1, wherein the crosslinking ratio in the neighborhood of the surface of the hydrogel-forming polymer is higher than the crosslinking ratio in the inside thereof.

9. The water-retaining support for a plant according to claim 1, wherein the hydrogel-forming polymer is a polymer showing a decrease in water absorption magnification along with an increase in temperature within a temperature range of not lower than 0° C. and not higher than 70° C. and showing a water absorption magnification which is reversibly changeable with respect to temperature.

10. The water-retaining support for a plant according to claim 1, further including a porous material.

11. A water-retaining support for a plant comprising a weakly acidic hydrogel-forming polymer.

12. The water-retaining support for a plant according to claim 11, wherein the weakly acidic hydrogel-forming polymer has a calcium ion absorption of less than 50 mg per g of dry weight and a water absorption magnification in ion-exchange water at room temperature, represented by the formula $(W_2-W_1)W_1$, of 100 or more, wherein $W_1$ is the weight of the dry hydrogel-forming polymer and $W_2$ is the weight of the hydrogel-forming polymer after immersion in excess of ion-exchange water at room temperature for 48 hours.

13. The water-retaining support for a plant according to claim 11, wherein the hydrogel-forming polymer is a polymer showing a decrease in water absorption magnification, represented by the formula $(W_2-W_1)/W_1$, wherein $W_1$ is the weight of the dry hydrogel-forming polymer and $W_2$ is the weight of the hydrogel-forming polymer after immersion in excess of ion-exchange water at room temperature for 48 hours, along with an increase in temperature within a temperature range of not lower than 0° C. and not higher than 70° C. and showing a water absorption magnification which is reversibly changeable with respect to temperature.

14. A plant-growing support comprising a water-retaining support for a plant comprising a hydrogel-forming polymer having a calcium ion absorption of less than 50 mg per g of dry weight thereof and having a water absorption magnification in ion-exchange water at room temperature, represented by the formula $(W_2-W_1)/W_1$, of 100 or more, wherein $W_1$ is the weight of the dry hydrogel-forming polymer and $W_2$ is the weight of the hydrogel-forming polymer after immersion in excess of ion-exchange water at room temperature for 48 hours, and a nutrient and/or plant growth-regulating substance retained in the support.

15. A plant-growing vessel comprising a vessel-shaped substrate capable of accommodating at least a portion of a plant and a water-retaining support for a plant comprising a hydrogel-forming polymer having a calcium ion absorption of less than 50 mg per g of dry weight thereof and having a water absorption magnification in ion-exchange water at room temperature, represented by the formula $(W_2-W_1)/W_1$, of 100 or more, wherein $W_1$ is the weight of the dry hydrogel-forming polymer and $W_2$ is the weight of the hydrogel-forming polymer after immersion in excess of ion-exchange water at room temperature for 48 hours, disposed in the vessel-shaped substrate.

16. The plant-growing vessel according to claim 15, wherein the water-retaining support for a plant is retained inside of the vessel in a fixed state.

17. A plant-growing support comprising a water-retaining support for a plant comprising a weakly acidic hydrogel-forming polymer and a nutrient and/or plant growth-regulating substance retained in the support.

18. A plant-growing support comprising a water-retaining support for a plant comprising a hydrogel-forming polymer having a calcium ion absorption of less than 50 mg per g of dry weight thereof and having a water absorption magnification in ion-exchange water at room temperature, represented by the formula $(W_2-W_1)/W_1$, of 100 or more, wherein $W_1$ is the weight of the dry hydrogel-forming polymer and $W_2$ is the weight of the hydrogel-forming polymer after immersion in excess of ion-exchange water at room temperature for 48 hours, wherein the hydrogel-forming polymer is a polymer showing a decrease in water absorption magnification along with an increase in temperature within a temperature range of not lower than 0° C. and not higher than 70° C. and showing a water absorption magnification which is reversibly changeable with respect to temperature and a nutrient and/or plant growth-regulating substance retained in the support.

19. A plant-growing support comprising a water-retaining support for a plant comprising a hydrogel-forming polymer having a calcium ion absorption of less than 50 mg per g of dry weight thereof and having a water absorption magnification in ion-exchange water at room temperature, represented by the formula $(W_2-W_1)/W_1$, of 100 or more, wherein $W_1$ is the weight of the dry hydrogel-forming polymer and $W_2$ is the weight of the hydrogel-forming polymer after immersion in excess of ion-exchange water at room temperature for 48 hours, and a porous material and a nutrient and/or plant-growth-regulating substance retained in the support.

20. A plant-growing vessel comprising a vessel-shaped substrate capable of accommodating at least a portion of a plant and a water-retaining support for a plant comprising a weakly acidic hydrogel-forming polymer disposed in the vessel-shaped substrate.

21. The plant-growing vessel according to claim 20, wherein the water-retaining support for a plant is retained inside of the vessel in a fixed state.

22. A plant-growing vessel comprising a vessel-shaped substrate capable of accommodating at least a portion of a plant and a water-retaining support for a plant comprising a hydrogel-forming polymer having a calcium ion absorption of less than 50 mg per g of dry weight thereof and having a water absorption magnification in ion-exchange water at room temperature, represented by the formula $(W_2-W_1)/W_1$, of 100 or more, wherein $W_1$ is the weight of the dry hydrogel-forming polymer and $W_2$ is the weight of the hydrogel-forming polymer after immersion in excess of ion-exchange water at room temperature for 48 hours, wherein the hydrogel-forming polymer is a polymer showing a decrease in water absorption magnification along with an increase in temperature within a temperature range of not lower than 0° C. and not higher than 70° C. and showing a water absorption magnification which is reversibly changeable with respect to temperature disposed in the vessel-shaped substrate.

23. The plant-growing vessel according to claim 22, wherein the water-retaining support for a plant is retained inside of the vessel in a fixed state.

24. A plant-growing vessel comprising a vessel-shaped substrate capable of accommodating at least a portion of a plant and a water-retaining support for a plant comprising a hydrogel-forming polymer having a calcium ion absorption of less than 50 mg per g of dry weight thereof and having a water absorption magnification in ion-exchange water at room temperature of 100 or more and a porous material disposed in the vessel-shaped substrate.

25. The plant-growing vessel according to claim 24, wherein the water-retaining support for a plant is retained inside of the vessel in a fixed state.

* * * * *